(12) United States Patent
Ohzuku et al.

(10) Patent No.: US 7,592,100 B2
(45) Date of Patent: *Sep. 22, 2009

(54) POSITIVE-ELECTRODE ACTIVE MATERIAL AND NONAQUEOUS-ELECTROLYTE SECONDARY BATTERY CONTAINING THE SAME

(75) Inventors: Tsutomu Ohzuku, Nara (JP); Hiroshi Yoshizawa, Hirakata (JP); Masatoshi Nagayama, Hirakata (JP)

(73) Assignees: Panasonic Corporation, Osaka (JP); Osaka City University, Osaka (JP)

( * ) Notice: Subject to any disclaimer, the term of this patent is extended or adjusted under 35 U.S.C. 154(b) by 238 days.

This patent is subject to a terminal disclaimer.

(21) Appl. No.: 10/333,269

(22) PCT Filed: Nov. 7, 2001

(86) PCT No.: PCT/JP01/09756

§ 371 (c)(1),
(2), (4) Date: Jan. 17, 2003

(87) PCT Pub. No.: WO02/078105

PCT Pub. Date: Oct. 3, 2002

(65) Prior Publication Data

US 2003/0170540 A1    Sep. 11, 2003

(30) Foreign Application Priority Data

Mar. 22, 2001   (JP)   .............................. 2001-083610

(51) Int. Cl.
*H01M 4/58*   (2006.01)
(52) U.S. Cl. .............. 429/231.1; 429/231.3; 429/218.1; 429/221; 429/223; 429/224

(58) Field of Classification Search ............... 429/231.1, 429/231.3, 218.1, 221, 223, 224
See application file for complete search history.

(56) References Cited

U.S. PATENT DOCUMENTS 5,160,712 A    11/1992   Thackeray et al.

(Continued)

FOREIGN PATENT DOCUMENTS

EP    0 554 906 A1    8/1993

(Continued)

OTHER PUBLICATIONS

Ohzuku, T. et al., "Electrochemistry amd Structural Chemistry of $LiNiO_2$ (R3m) for 4 Volt Secondary Lithium Cells" J. Electrochem. Soc., Jul. 1993, vol. 140, No. 7 pp. 1862-1870.

(Continued)

*Primary Examiner*—Laura S Weiner
(74) *Attorney, Agent, or Firm*—McDermott Will & Emery LLP

(57) ABSTRACT

The present invention provides a high-capacity and low-cost non-aqueous electrolyte secondary battery, comprising: a negative electrode containing, as a negative electrode active material, a ssubstance capable of absorbing/desorbing lithium ions and/or metal lithium; a separator; a positive electrode; and an electrolyte, wherein the positive electrode active material contained in the positive electrode is composed of crystalline particles of an oxide containing two kinds of transition metal elements, the crystalline particles having a layered crystal structure, and oxygen atoms constituting the oxide forming a cubic closest packing structure.

14 Claims, 12 Drawing Sheets

U.S. PATENT DOCUMENTS

| | | | |
|---|---|---|---|
| 5,264,201 A | 11/1993 | Dahn et al. | |
| 5,370,948 A | 12/1994 | Hasegawa et al. | |
| 5,393,622 A | 2/1995 | Nitta et al. | |
| 5,626,635 A | 5/1997 | Yamaura et al. | |
| 5,629,110 A | 5/1997 | Kobayashi et al. | |
| 5,677,087 A | 10/1997 | Amine et al. | |
| 5,738,957 A | 4/1998 | Amine et al. | |
| 5,981,106 A | 11/1999 | Amine et al. | |
| 5,985,237 A | 11/1999 | Lu et al. | |
| 6,045,771 A | 4/2000 | Matsubara et al. | |
| 6,168,887 B1 | 1/2001 | Dahn et al. | |
| 6,291,107 B1 | 9/2001 | Shimizu et al. | |
| 6,352,794 B1 * | 3/2002 | Nakanishi et al. | 429/231.1 |
| 6,416,902 B1 | 7/2002 | Miyasaka | |
| 6,436,577 B1 | 8/2002 | Kida et al. | |
| 6,551,744 B1 | 4/2003 | Ohzuku et al. | |
| 6,582,854 B1 | 6/2003 | Qi et al. | |
| 6,660,432 B2 | 12/2003 | Paulsen et al. | |
| 6,753,111 B2 | 6/2004 | Kweon et al. | |
| 6,773,852 B2 | 8/2004 | Cho et al. | |
| 6,808,848 B2 | 10/2004 | Nakanishi et al. | |
| 6,964,828 B2 * | 11/2005 | Lu et al. | 429/224 |
| 7,078,128 B2 | 7/2006 | Lu et al. | |
| 2002/0009645 A1 | 1/2002 | Shima et al. | |
| 2002/0197532 A1 | 12/2002 | Thackeray et al. | |
| 2003/0054251 A1 | 3/2003 | Ohzuku et al. | |
| 2003/0082448 A1 | 5/2003 | Cho et al. | |
| 2003/0082452 A1 | 5/2003 | Ueda et al. | |
| 2003/0087154 A1 | 5/2003 | Ohzuku et al. | |
| 2003/0129496 A1 | 7/2003 | Kasai et al. | |
| 2004/0058243 A1 | 3/2004 | Ohzuku et al. | |
| 2004/0110063 A1 | 6/2004 | Uchitomi et al. | |
| 2004/0126660 A1 | 7/2004 | Ohzuku et al. | |
| 2005/0079416 A1 | 4/2005 | Ohzuku et al. | |
| 2005/0147889 A1 | 7/2005 | Ohzuku et al. | |
| 2005/0260496 A1 | 11/2005 | Ueda et al. | |
| 2005/0271576 A1 | 12/2005 | Awano et al. | |
| 2006/0099508 A1 | 5/2006 | Thackeray et al. | |
| 2006/0204847 A1 | 9/2006 | Ohzuku et al. | |
| 2007/0009424 A1 | 1/2007 | Ohzuku et al. | |

FOREIGN PATENT DOCUMENTS

| | | |
|---|---|---|
| EP | 0 630 064 | 12/1994 |
| EP | 0 989 622 A1 | 3/2000 |
| EP | 1 026 765 | 8/2000 |
| EP | 1 073 136 | 1/2001 |
| EP | 1 295 851 A1 | 3/2003 |
| EP | 1 309 022 A2 | 5/2003 |
| JP | 63-121258 | 5/1988 |
| JP | 3244314 | 10/1991 |
| JP | 4-267053 | 9/1992 |
| JP | 05-242891 | 9/1993 |
| JP | 5-283076 | 10/1993 |
| JP | 05-283076 | 10/1993 |
| JP | 06-072708 | 3/1994 |
| JP | 6-96768 | 4/1994 |
| JP | 08-171910 A | 12/1994 |
| JP | 7-37576 | 2/1995 |
| JP | 08-138670 A | 5/1996 |
| JP | 8-171910 | 7/1996 |
| JP | 8-217452 | 8/1996 |
| JP | 2547992 | 10/1996 |
| JP | 09-055210 | 2/1997 |
| JP | 9-129229 A | 5/1997 |
| JP | 9-129230 | 5/1997 |
| JP | 9-129230 A | 5/1997 |
| JP | 10-3921 | 1/1998 |
| JP | 10-69910 | 3/1998 |
| JP | 10-199525 | 7/1998 |
| JP | 08-213015 A | 8/1998 |
| JP | 10-310433 | 11/1998 |
| JP | 10-316431 A | 12/1998 |
| JP | 11-1323 * | 1/1999 |
| JP | 11-025980 | 1/1999 |
| JP | 11-060246 A | 3/1999 |
| JP | 11071115 | 3/1999 |
| JP | 11-167919 | 6/1999 |
| JP | 11-1323 | 7/1999 |
| JP | 11-310416 | 9/1999 |
| JP | 11-292547 | 10/1999 |
| JP | 11-307094 | 11/1999 |
| JP | 11-339802 | 12/1999 |
| JP | 2000-77071 A | 3/2000 |
| JP | 2000-082466 | 3/2000 |
| JP | 2000-133262 | 5/2000 |
| JP | 2000-133262 A | 5/2000 |
| JP | 2000-149923 | 5/2000 |
| JP | 2000149942 | 5/2000 |
| JP | 2000-182618 A | 6/2000 |
| JP | 2000-195514 A | 7/2000 |
| JP | 2000-223122 A | 8/2000 |
| JP | 2000-251892 | 9/2000 |
| JP | 2000-268874 A | 9/2000 |
| JP | 2000-323123 A | 11/2000 |
| JP | 2000-340230 | 12/2000 |
| JP | 2001-23640 A | 1/2001 |
| JP | 2001-035495 | 2/2001 |
| JP | 2001-85006 | 3/2001 |
| JP | 2001-185145 A | 7/2001 |
| JP | 2001-185153 * | 7/2001 |
| JP | 2001-192210 | 7/2001 |
| JP | 2001-202959 A | 7/2001 |
| JP | 2001-243952 | 9/2001 |
| JP | A-2001-332261 | 11/2001 |
| JP | 3244314 | 1/2002 |
| JP | 2002-42813 | 2/2002 |
| JP | 2002-100358 | 4/2002 |
| JP | 2002-145623 | 5/2002 |
| JP | 2002-158011 | 5/2002 |
| JP | 2002-304993 A | 10/2002 |
| JP | 2002-338250 | 11/2002 |
| JP | 2003-59490 | 2/2003 |
| JP | 2003-137555 | 5/2003 |
| JP | 2003-221236 | 8/2003 |
| JP | A-2004-002141 | 1/2004 |
| KR | 10-2002-0019221 | 3/2002 |
| KR | 2000-0017619 | 3/2003 |
| WO | WO 98/57386 A1 | 7/1996 |
| WO | WO 01/99215 A1 | 12/2001 |
| WO | WO 02/40404 | 5/2002 |
| WO | WO 03/015198 A2 | 2/2003 |

OTHER PUBLICATIONS

Spahr, M. et al. "Characterization of Layered Lithium Nickel Manganese Oxides Synthesized by a Novel Oxidative Coprecipitation Method and Their Electrochemical Performance as Lithium Insertion Electrode Materials" J. Electrochem. Soc., Apr. 1998, vol. 145, No. 4, pp. 1113-1120.

Kanno, R. et al., "Structure and Physical Properties in Cathode Materials for Lithium Secondary cells -Lithium Nickel Oxides and Lithium Manganese Oxides" Department of Chemistry, Faculty of Science, Kobe University, announced on Dec. 7, 1998, pp. 85-95. (Partial translation attached).

Arai, H. et al., "Electrochemical and Thermal Behavior of $LiNi_{1-z}M_zO_2$ (M=Co, Mn, Ti)" J. Electrochem. Soc., Sep. 1997, vol. 144, No. 9, pp. 3117-3125.

B.J. Neudecker et al., "Lithium Mangnese Nickel Oxides $Li_x(Mn_yNi_{1-y})_{2-x}O_2$", J. Electrochem. Soc., vol. 145, No. 12, Dec. 1998, pp. 4148-4159.

E. Rossen et al., "Structure and electrochemistry of $Li_xMn_yNi_{1-y}O_2$", Solid State Ionics 57(1992) pp. 311-318.

Ohzuku et al. Chemistry Letters, vol. 30 (2001), No. 7, pp. 642-643.

Ohzuku et al. Chemistry Letters, vol. 30 (2001), No. 8, pp. 744-745.

Qiming Zhong et al., "Synthesis and Electrochemistry of $LiNi_xMn_{2-x}O_4$", J. Electrochem. Soc., vol. 144, No. 1, Jan. 1997, pp. 205-213.

M.M. Grush et al., "Correlating Electronic Structure with Cycling Performance of Substituted $LiMn_2O_4$ Electrode Materials: A Study Using the Techniques of Soft X-ray Absorption and Emission", Chem. Mater, 2000, 12, pp. 659-664.

"Layered Cathode Materials $Li[Ni_xLi_{(1/3-2x/3)}Mn_{(2/3-x/3)}]O_z$ for Lithium-ion Batteries." Zhonghua Lu, et al. *Electrochemical and Solid-State Letters* 4(11) (2001), pp. A191-A194.

"Relationship Between Chemical Bonding Character and Electrochemical Performance in Nickel-Substituted Lithium Manganese Oxides." Hyo-Suk Park, et al. *J. Phys. Chem.* B vol. 105 No. 21 (2001), pp. 4860-4866.

"Synthesis, Structure, and Electrochemical Behavior of $Li[Ni_xLi_{1/3-2x/3}Mn_{2/3-x/3}]O_z$." Zhonghua Lu, et al. *Journal of the Electrochemical Society* 149(6) (2002) pp. A778-A791.

"Preparation by a 'chimie douce' route and characterization of $LiNi_zMn_{1-z}O2$ ($0.5 \leq z \leq 1$) Cathode Materials." Daniel Caurant, et al. *J. Mater. Chem.* 6(7) (1996), pp. 1149-1155.

Atsushi Ueda et al., "Solid-State Redox Reactions of $LiNi_{1/2}Co_{1/2}O_2$ (R3m) for 4 Volt Secondary Lithium Cells", J. Electrochem. Soc., vol. 141, No. 8, Aug. 1994, pp. 2010-2014.

Tabuchi M et al., "Electrochemical and magnetic properties of lithium manganese oxide spinels prepared by oxidation at low temperature of hydrothermally obtained LiMn02", vol. 89, No. 1-2, Aug. 1, 1996, pp. 53-63, XP004070124.

Search Report dated May 30, 2006.

Lu, Z. et al., Layered Cathode Materials $Li[Ni_xLi_{(1/3-2x/3)}Mn_{(2/3-x/3)}]O_2$ for Lithium-Ion Batteries, Electrochemical and Solids-Sate Letters, 2001, p. A191-A194, vol. 4, The Electrochemical Society, Inc.

Lu, Z. et al., "Layered $Li[Ni_xCo_{1-2x}Mn_x]O_2$ Cathode Materials for Lithium-Ion Batteries," Electrochemical and Solid-State Letters, p. A200-A203, vol. 12, The Electrochemical Society, Inc.

Terada, Y. et al., "In Situ XAFS Analysis of $Li(Mn, M)_2 O_4$(M=Cr, Co, Ni) 5V Cathode Materials for Lithium-Ion Secondary Batteries," Journal of Solid Sate Chemistry, Feb. 2001, p. 286-291, vol. 156 Issue 2, Academic Press.

Park, H. et al., "Relationship between Chemical Bonding Character and Electrochemical Performance in Nickel-Substituted Lithium Manganese Oxides," J. Phys. Chem., May 3, 2001, p. 4860-4866, vol. 105, American Chemical Society.

Korean Office Action issued in Korean Patent Application No. 10-2006-0100852, dated Jan. 17, 2007.

Japanese Office Action issued in Japanese Patent Application No. 2003-281871, dated Feb. 1, 2007.

Lu et al., "Superlattice Ordering of Mn, Ni, and Co in Layered Alkali Transition Metal Oxides with P2, P3, and O3 Structures," Chem. Mater, p. 3583-3590, vol. 12, American Chemical Society.

Abraham, et al., "Surface changes on $LiNi_{0.8}Co_{0.2}O_2$ particles during testing of high power lithium-ion cells," Electrochemistry Communications, May 2002, p. 620-625, vol. 4, Elsevier.

Japanese Office Action issued in Japanese Patent Application No. 2002-303294, dated Mar. 1, 2007.

West et al., "Introduction for Solid-State Chemistry," Kodansha-Scientific, Mar. 20, 1996, with partial translation.

Yoshio et al., "Lithium-ion Secondary Battery," Nikkan Kogyo Shinbunsha, Mar. 29, 1996, with partial translation.

Saka, K, "Study of Crystal Electron Microscope," Uchida Rokakuho, Nov. 25, 1997, with partial translation.

Japanese Society of Microscopy, Kanto Division, "Technique of Electron microscope technique for advanced material evaluation," Asakura-shoten, Dec. 15, 1991, with partial translation.

Kato, M., "Analysis of X-ray diffraction," Uchida Rokakuho, Apr. 20, 1990, with partial translation.

Observations of a third party submitted to Japanese Patent Application No. 2000-227858 corresponding to USP 6551744.

Observations of a third party submitted to Japanese patent application No. 2002-303294 corresponding to U.S. Appl. No. 10/277,989.

Neudecker, B.J. et al., "Lithium Manganese Nickel Oxides $Li_x(Mn_yNi_{1-y})_{2-x}O_2$," J. Electrochem. Soc., Dec. 1998, p. 4148-1459, vol. 145, No. 12, The Electrochemical Society, Inc.

Yoshio, M. et al., "Preparation and properties of $LiCo_yMn_zNi_{1-x-y}O_2$ as a chathode for lithium ion batteries," Journal of Power Sources, Aug. 17, 1998, p. 176-181, vol. 90, Elsevier.

Cho, T. et al., "Preparation of Layered $Li[Ni_{1/3}Mn_{1/3}Co_{1/3}]O_2$ as a Cathode for Lithium Secondary Battery by Carbonate Coprecipitation Method," Chemistry Letters, Feb. 24, 2004, p. 704-705, vol. 33 No. 6, The Chemical Society of Japan, Japan.

Ohzuku, T. et al., "Why transition metal (di) oxides are the most attractive materials for batteries," Solid State Ionics, Aug. 1994, p. 202-211, vol. 69 No. 3,4, North-Holland, The Netherlands.

Ohzuku, T. et al., "Synthesis and Characterization of $LiAl_{1/4}Ni_{3/4}O_2$ (R3m) for Lithium-Ion (Shuttlecock) Batteries," Journal of the Electrochemical Society, Dec. 1995, p. 4033-4039, vol. 142 No. 12, The Electrochemical Society, Inc.

Ohzuku, T. et al., "New Route to Prepare $LiNiO_2$ For 4-Volts Secondary Lithium Cells," Chemistry Express, vol. 7, No. 9, pp. 689-692, 1992, Kinki Chemical Society, Japan.

Ohzuku, T. et al., "Synthesis and Characterization of $LiNiO_2$ (R3m) for Rechargeable Nonaqueous Cells," Chemistry Express, vol. 6, No. 3, Mar. 1991, pp. 161-164, Kinki Chemical Society, Japan.

Ohzuku, T. et al., "Solid State Electrochemistry of Intercalation Compound of $LiAl_{1/2}Ni_{1/2}O_2$(R3m) for Lithium-Ion Batteries," Electrochemisty of Intercalation, (1998), p. 1209-1214, vol. No. 12, The Electrochemical Society of Japan, Japan.

Ohzuku, T. et al., "Comparative Study of $LiCoO_2$, $LiNi_{1/2}Co_{1/2}O_2$ And $LiNiO_2$ For 4 Volt Secondary Lithium Cells," The Journal of The International Society Of Electrochemisty, Jun. 1993, p. 1159-1167, vol. 38 No. 9, Pergamon Press.

Japanese Office Action, issued in Japanese Patent Application No. 2003-281871, mailed on Apr. 12, 2007.

Japanese Office Action, issued in Japanese Patent Application No. 2002-303294, dated on Sep. 21, 2007.

Observations by a Third party to the Japanese Patent Office for the Japanese application No. 2006-226713.

Japanese Office Action issued in Japanese Patent Application No. JP 2002-576035, dated on Feb. 21, 2008.

Japanese Office Action issued in Japanese Patent Application No. JP 2002-303294, mailed May 8, 2008.

Lu, Z., et al., Layered $Li[Ni_xCo_{1-2x}Mn_x]O_2$ Cathode Materials for Lithium-Ion Batteries, Electrochemical and Solid-State Letters, 2001, pp. A200-A203, 4(12), The Electrochemical Society Inc.

Japanese Office Action issued in Japanese Patent Application No. JP 2003-281871, mailed May 15, 2008.

European Search Report issued in European Patent Application No. EP 4256668.7-1227 dated on Aug. 6, 2008.

Japanese Office Action issued in Japansese Patent Application No. JP 2001-195353 dated on Aug. 28, 2008.

* cited by examiner

POSITIVE-ELECTRODE ACTIVE MATERIAL AND NONAQUEOUS-ELECTROLYTE SECONDARY BATTERY CONTAINING THE SAME

TECHNICAL FIELD

The present invention relates to a positive electrode active material, particularly to a positive electrode active material for a non-aqueous electrolyte battery. The present invention further relates to a high-capacity and low-cost non-aqueous electrolyte secondary battery having a positive electrode containing a specific positive electrode active material.

BACKGROUND ART

In recent years, with the widespread use of cordless and portable AV appliances, personal computers and the like, the need has been increasing for compact, light weight, and high energy density batteries as power sources for driving those appliances. In particular, lithium secondary batteries, as having high energy density, are expected to be dominant batteries in the next generation, and the potential market thereof is very large.

In most of the lithium secondary batteries currently available on the market, $LiCoO_2$ having a high voltage of 4 V is used as the positive electrode active material, but $LiCoO_2$ is costly because Co is expensive. Under such circumstances, research has been progressing to investigate various positive electrode active materials as substitutes for $LiCoO_2$. Among them, a lithium-containing transition metal oxide has been wholeheartedly researched: $LiNi_aCo_bO_2$ (a+b≈1) is promising, and it seems that $LiMn_2O_4$ having a spinel structure has already been commercialized.

In addition, nickel and manganese as substitute materials for expensive cobalt have also been under vigorous research.

$LiNiO_2$ having a layered structure, for example, is expected to have a large discharge capacity, but the crystal structure of $LiNiO_2$ changes during charging/discharging, causing a great deal of deterioration thereof. In view of this, it is proposed to add to $LiNiO_2$ an element that can stabilize the crystal structure during charging/discharging and thus prevent the deterioration. As the additional element, specifically, there are exemplified cobalt, manganese, titanium and aluminum.

Moreover, prior art examples which use composite oxides of Ni and Mn as the positive electrode active material for lithium secondary batteries will be described: U.S. Pat. No. 5,393,622, for example, proposes a method in which a hydroxide of Ni, a hydroxide of Mn and a hydroxide of Li are dry-mixed together and baked and, after cooling them down to room temperature, the mixture is again heated and baked to obtain an active material having a composition represented by the formula $Li_yNi_{1-x}Mn_xO_2$ wherein $0 \leq x \leq 0.3$, $0 \leq y \leq 1.3$.

Further, U.S. Pat. No. 5,370,948 proposes a method in which a Li salt, a Ni salt and a Mn salt are mixed together into an aqueous solution, followed by drying and baking, to obtain an active material represented by the formula $LiNi_{1-x}Mn_xO_2$ wherein $0.005 \leq x \leq 0.45$.

Further, U.S. Pat. No. 5,264,201 proposes a dry synthesis method in which hydroxides or oxides of nickel and manganese and an excess amount of lithium hydroxide are mixed together and baked, and a synthesis method in which an oxides of nickel and manganese or the like are added to a saturated aqueous solution of lithium hydroxide to form a slurry, which is then dried and baked under a reduced pressure, to obtain an active material represented by the formula $Li_xNi_{2-x-y}Mn_yO_2$ wherein $0.8 \leq x \leq 1.0$, $y \leq 0.2$.

Furthermore, U.S. Pat. No. 5,629,110 proposes a dry mixing synthesis method which uses β-$Ni(OH)_2$ to obtain an active material represented by the formula $LiNi_{1-x}Mn_xO_2$ wherein $0 < x \leq 0.2$, $y \leq 0.2$.

Japanese Laid-Open Patent Publication No. Hei 8-171910 proposes a method in which manganese and nickel are coprecipitated by adding an alkaline solution into an aqueous solution mixture of manganese and nickel, then lithium hydroxide is added and the resulting mixture is baked, to obtain an active material represented by the formula $LiNi_xMn_{1-x}O_2$ wherein $0.7 \leq x \leq 0.95$.

Further, Japanese Laid-Open Patent Publication No. Hei 9-129230 discloses a preferable particulate active material having a composition represented by the formula $LiNi_xM_{1-x}O_2$ wherein M is at least one of Co, Mn, Cr, Fe, V and Al, $1 > x \geq 0.5$, and shows a material with x=0.15 as the active material containing Ni and Mn.

Further, Japanese Laid-Open Patent Publication No. Hei 10-69910 proposes an active material synthesized by a coprecipitation synthesis method, represented by the formula $Li_{y-x1}Ni_{1-x2}M_xO_2$ wherein M is Co, Al, Mg, Fe, Mg or Mn, $0 < x_2 \leq 0.5$, $0 \leq x_1 < 0.2$, $x = x_1 + x_2$, and $0.9 \leq y \leq 1.3$. This patent publication describes that the discharge capacity is inherently small if M is Mn, and the essential function of the positive electrode active material for a lithium secondary battery intended to achieve a high capacity is dismissed if $x_2$ is more than 0.5. $LiNi_{0.6}Mn_{0.4}O_2$ is exemplified as a material having the highest proportion of Mn.

It should be noted that, although U.S. Pat. No. 5,985,237 shows a production method of $LiMnO_2$ having a layered structure, this is practically a 3 V level active material.

All of the prior art examples disclosed in the above U.S. patents and Japanese Laid-Open Patent Publications are intended to improve the electrochemical characteristics such as the cycle characteristic of $LiNiO_2$ by adding a trace amount of an element to $LiNiO_2$, while retaining the characteristic properties of $LiNiO_2$. Accordingly, in the active material obtained after the addition, the amount of Ni is always larger than that of Mn, and the preferable proportion is considered to be Ni:Mn=0.8:0.2. As an example of a material having a proportion with a highest amount of Mn, Ni:Mn=0.55:0.45 is disclosed.

However, in any of these prior art examples, it is difficult to obtain a composite oxide having a single-phase crystal structure since $LiNiO_2$ is separated from $LiMnO_2$. This is because nickel and manganese are oxidized in different areas during coprecipitation, and a homogenous oxide is not likely to be formed.

As described above, as a substitute material for the currently commercialized $LiCoO_2$ having a high voltage of 4 V, $LiNiO_2$ and $LiMnO_2$ as high-capacity and low-cost positive electrode active materials having a layered structure like $LiCoO_2$ have been researched and developed.

However, the discharge curve of $LiNiO_2$ is not flat, and the cycle life is short. In addition, the heat resistance is low, and hence the use of this material as the substitute material for $LiCoO_2$ would involve a serious problem. In view of this, improvements have been attempted by adding various elements to $LiNiO_2$, but satisfactory results have not been obtained yet. Further, since a voltage of only 3 V can be obtained with $LiMnO_2$, $LiMn_2O_4$ which does not have a layered structure but has a spinel structure with low-capacity is beginning to be researched.

Namely, required has been a positive electrode active material which has a voltage of 4V, as high as $LiCoO_2$, exhibits a flat discharge curve, and whose capacity is higher and cost is lower than $LiCoO_2$; further required has been a high-capacity non-aqueous electrolyte secondary battery with excellent charge/discharge efficiency, which uses the above positive electrode active material.

As opposed to this, Japanese Patent Application No. 2000-227858 does not propose a technique for improving the inherent characteristics of LiNiO$_2$ or those of LiMnO$_2$ by adding a new element thereto, but proposes a positive electrode active material composed of a nickel manganese composite oxide which represents a new function by dispersing a nickel compound and a manganese compound uniformly at the atomic level to form a solid solution.

That is to say, the prior art examples propose plenty of additional elements, but not technically clarify which elements are specifically preferred, whereas the above application proposes the positive electrode active material which can represent a new function by combining nickel and manganese at about the same ratio.

Based on the finding that a nickel-manganese composite oxide exhibiting a new function was obtained by dispersing a nickel compound and a manganese compound uniformly in the atomic level to form a solid solution, the present inventors have made further vigorous examinations on oxides containing various transition metals, together with the compositions, crystal structures, functions and the like thereof.

That is, it is an object of the present invention to find a positive electrode active material made of a composite oxide exhibiting a further new function using the technology of forming a solid solution by dispersing different transition metal elements uniformly in the atomic level.

DISCLOSURE OF INVENTION

The present invention relates to a positive electrode active material for a non-aqueous electrolyte battery, comprising crystalline particles of a lithium-containing oxide containing two kinds of transition metal elements, the crystalline particles having a layered crystal structure and oxygen atoms constituting the lithium-containing oxide forming a cubic closest packing structure.

Preferably, the lithium-containing oxide is expressed by formula (1):

wherein A and B are different transition metal elements, $0 \leq x \leq 0.3$ and $0 < y < 1$). That is, the lithium-containing oxide expressed by formula (1) contains two kinds of transition metal elements.

It is effective if the two kinds of transition metal elements are selected from the group consisting of iron, nickel, manganese and cobalt.

Among the above elements, the nickel element and the manganese element are preferably selected as the two kinds of transition metal elements. In other words, in the crystalline particles described above, nickel atoms and the manganese atoms are preferably dispersed uniformly.

Preferably, in the crystal structure of the crystalline particles, the integral intensity ratio $I_{003}/I_{104}$ of the X-ray diffraction peak attributed to Miller indices (003) to that attributed to Miller indices (104) is less than 1.

Preferably, the crystal structure of the crystalline particles has powder X-ray diffraction peaks attributed to Miller indices (108) and (110) observed as two split peaks.

The lithium-containing oxide preferably contains two kinds of transition metal elements in substantially the same proportion. It is effective if the crystalline particles are spherical in shape.

It is effective that the positive electrode active material is composed of a mixture of crystalline particles of the lithium-containing oxide having a particle size of 0.1 to 2 μm and secondary particles of the above crystalline particles having a particle size of 2 to 20 μm.

It is effective that the volume of unit cells of the crystalline particles decreases by oxidation.

It is effective that the error of the ratio of the nickel element to the manganese element is within 10 atomic %.

It is effective if the lithium element, the nickel element and the manganese element contained in the lithium-containing oxide satisfy $0.97 \leq Li/(Ni+Mn) \leq 1.03$.

To obtain the lithium-containing oxide described above, the preferably used precursor is a hydroxide or an oxide containing two or more kinds of transition metals, in which the half-width of a peak observed in the range of 15 to 20° in X-ray diffraction peaks measured with Kα ray of copper is 3° or less.

In the X-ray diffraction peaks, the peak height $H_1$ observed in the range of 15 to 20° and the peak height $H_2$ observed in the range of 30 to 40° preferably satisfy the relation:

$$H_1 \geq 2 \times H_2.$$

Therefore, the lithium-containing oxide is obtained by mixing the precursor described above with a lithium compound such as lithium carbonate and/or lithium hydroxide and sintering the mixture. The sintering is preferably performed at a temperature of 900° C. or higher.

Alternatively, the lithium-containing oxide is preferably expressed by formula (2):

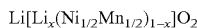

wherein $0 \leq x \leq 0.3$.

Otherwise, the lithium-containing oxide is preferably expressed by formula (3):

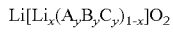

wherein A and B are different transition metal elements, C is at least one kind of an added element different from A and B, $0 \leq x \leq 0.3$ and $0 < 2y+p \leq 1$.

The added element C is preferably at least one kind selected from the group consisting of aluminum, magnesium, calcium, strontium, yttrium, ytterbium, iron, nickel, manganese and cobalt.

The ratio of the amount of the added element C to the total amount of the transition metal elements A and B and the added element C is preferably 5 to 35 mol %.

According to another aspect, the present invention relates to a non-aqueous electrolyte secondary battery comprising: a negative electrode containing a substance capable of absorbing/desorbing at least lithium ions and/or metal lithium as a negative electrode active material; a separator; a positive electrode containing the positive electrode active material described above; and an electrolyte.

According to the present invention, a non-aqueous electrolyte secondary battery with high capacity and good charge/discharge efficiency can be provided.

BEST MODE FOR CARRYING OUT THE INVENTION

Figure 1:
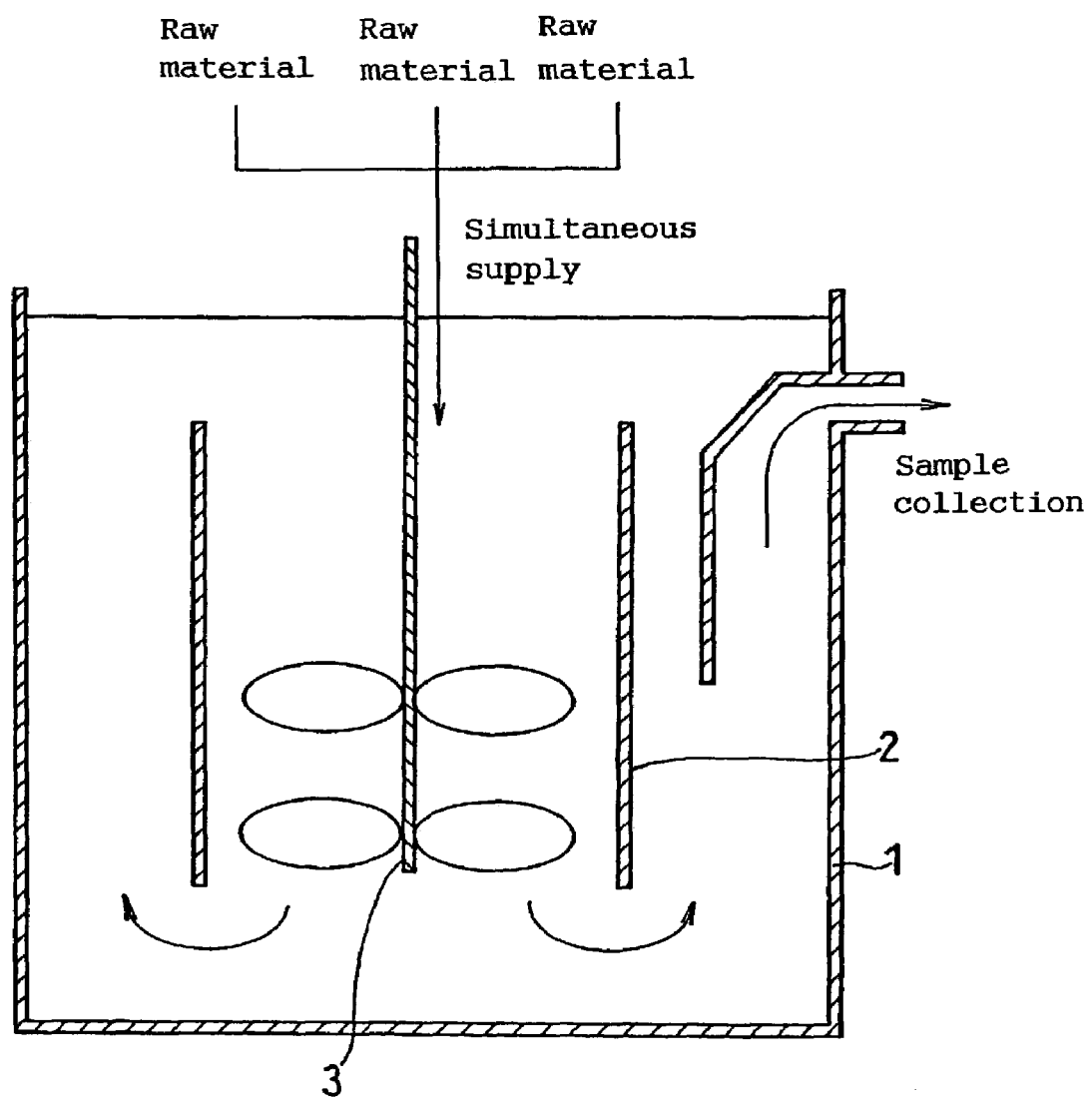
FIG. 1 is a schematic view of an experimental apparatus used for producing a positive electrode active material by coprecipitation method according to the present invention.

As described above, a positive electrode active material composed of a nickel-manganese composite oxide exhibiting a new function is conventionally obtained by forming a solid solution by dispersing a nickel compound and a manganese compound uniformly in the atomic level. Based on this prior art, the present inventors have found that a further new function can be obtained by mixing two kinds of any transition metals if a specific structure is further provided. In particular, the inventors have found that it is important from the viewpoint of the composition that the two kinds of transition metals should be roughly equal in quantity to each other, and also important from the viewpoint of the crystal structure that a layered structure should be established and oxygen atoms should form a cubic closest packing structure.

Preferably, the positive electrode active material of the present invention is composed of crystalline particles of a lithium-containing oxide containing two kinds of transition metal elements, wherein the crystalline particles has a layered crystal structure, and oxygen atoms constituting the lithium-containing oxide form a cubic closest packing structure.

Hereinafter, the present invention will be sometimes described in detail using nickel and manganese as representatives of the transition metal elements described above, but a new function can also be obtained using other transition metal elements by satisfying the conditions described above.

(1) Composition and Structure of Positive Electrode Active Material of the Present Invention First, features of the positive electrode active material of the present invention will be described from the viewpoint of the crystal structure.

Preferably, the positive electrode active material of the present invention preferably has a layered crystal structure, and has properties that the integral intensity ratio $I_{003}/I_{104}$ of the X-ray diffraction peak attributed to Miller indices (003) to that attributed to Miller indices (104) satisfies $I_{003}/I_{104}<1$ and that the powder X-ray diffraction peaks attributed to Miller indices (108) and (110) are observed as two split peaks.

In general, if a material has a layered structure, the integral intensity ratio of (003) to (104), $I_{003}/I_{104}$, satisfies $I_{003}/I_{104}>1$. $LiCoO_2$, $LiNiO_2$ and the like presently mainly used as the positive electrode active material for lithium secondary batteries satisfy this relation. A material satisfying $I_{003}/I_{104}<1$ has a problem that a transition metal drops in the layer of Li ions in the layered structure, resulting in decreasing the capacity and lowering the usefulness. Also, in $LiCoO_2$, $LiNiO_2$ and the like, the powder X-ray diffraction peaks attributed to Miller indices (108) and (110) are not clearly observed as two split peaks.

On the contrary thereto, the positive electrode active material of the present invention has distinctive features that $I_{003}/I_{104}<1$ is satisfied and that the (108) and (110) peaks are clearly observed as two split peaks. As a result of structural analysis, it has been almost clarified that the positive electrode active material of the present invention has a layered structure and oxygen atoms in the material form a cubic closest packing structure, although the detailed atomic locations in the crystal lattice are not yet clarified.

Next, features of the positive electrode active material of the present invention will be described from the viewpoint of the elemental composition. First, the combination of nickel and manganese will be described. Considering the charge/discharge curves of $LiNiO_2$, $LiCoO_2$ and $LiMnO_2$ having a layered structure as the reference, the potential is 4 V for Co, 3.7 V for Ni, and 3 V for Mn. Therefore, to prepare an active material having a 4V-class layered structure, it is generally attempted to combine Co and Ni, or add a trace amount of a third element to these elements for stabilization of the crystal structure while maintaining the potential-related features of these elements. These attempts are described in prior art as follows. It is noted that the prior art merely describes that the added element, represented as M, can be various elements, and has not examined in detail the change in potential related to the added element.

U.S. Pat. No. 5,264,201 discloses an active material having a composition of formula $Li_xNi_{2-x-y}M_yO_2$ wherein $0.8 \leq x \leq 1.0$ and $y \leq 0.2$; if M is Co, $y<0.5$. As the added element M, Co, Fe, Ti, Mn, Cr and V are disclosed. As is found from this prior art, many added elements M are proposed for Ni as the reference, and the added amount is a trace. Therefore, this prior art neither discloses nor suggests the idea of performing the potential-related control with the combination of an added element only by adding the added element while maintaining the potential-related feature of Ni. This prior art only describes that the added amount is large when it is Co, and it is considered that this combination has been examined due to the well-known facts that Co has a high potential and the potential of Co is roughly equal to the potential of Ni.

Japanese Laid-Open Patent Publication No. 4-267053 discloses an active material having a composition of formula $Li_xM_yN_zO_2$ wherein M: Fe, Co, Ni and N: Ti, V, Cr, Mn, and describes that the active material is synthesized by realizing the voltage of 4 V with the use of element M and by stabilizing the structure with the use of element N.

The above idea of the prior art is clearly different from the idea of the present invention that two kinds of elements are mixed in roughly the same proportion to obtain a new function. Specifically, the potential of an active material having a layered structure including a mixture of Ni and Co in the same proportion is low compared with the potential of an active material including Ni alone. On the contrary, the potential of an active material having a layered structure including a mixture of Ni and Mn in the same proportion is high compared with the potential of an active material including Ni alone.

The above phenomenon cannot be expected from the active material having a layered structure including Co, Ni or Mn alone, because the potentials of these active materials are higher in the order of Co>Ni>Mn. That is, from the prior art and the potentials of the single materials, it is expected that the voltages of the active materials are higher in the order of Ni—Co>Ni>Ni—Mn and, however, they are higher in the order of Ni—Mn>Ni>Ni—Co in actual. That is, the opposite phenomenon occurs. This indicates that development of a new function is possible by mixing two kinds of transition metals in the same proportion to synthesize an active material having a layered structure. Thus, the present invention also includes the obtainment of a new function by using, not only the combination of Ni and Mn in the same proportion, but also a combination of other transition metal elements in the same proportion. For example, the use of Ni, Mn, Fe, Co and Ti is suggested.

Among others, the combination of nickel and manganese is preferred for the following reason. When the lithium-containing oxide is used in the positive electrode active material for lithium secondary batteries, Li goes in/comes out from crystals by charge/discharge. When a general active material is used, the electron conductivity of the active material decreases in the final stage of discharge, and therefore the discharge curve becomes slow. This is considered to be polarization caused by decrease of the electron conductivity. However, in the combination of nickel and manganese, the electron states inherent to the respective elements interact with each other and, therefore, it is possible to suppress the electron conductivity from significantly decreasing in the final stage of discharge. As a result, the charge/discharge curve depicts a desirable flat shape.

(2) Production Method of Positive Electrode Active Material of the Present Invention To obtain the positive electrode active material of the present invention, some contrivance is also required for the method for synthesizing the lithium-containing oxide.

Conventionally, for synthesis of a lithium-containing oxide as the positive electrode active material, hydroxides, oxy hydroxides, oxides and the like containing relevant elements are mixed and the mixture is sintered. For example, for synthesis of $LiNi_{0.5}Mn_{0.5}O_2$, a typical material of the present invention, $LiOH \cdot H_2O$, $Ni(OH)_2$ and MnOOH are mixed sufficiently at a ratio of 2:1:1 (mole ratio), and then the mixture is sintered at a temperature appropriate for progress of the reaction.

The dry mixing synthesis method as described above is described in U.S. Pat. Nos. 5,393,622, 5,370,948 and 5,264,201 and each of these publications describes that the dry synthesis method is adequate since the content of Mn is small.

Actually, however, in the dry mixing synthesis method disclosed in the above publications, it is difficult to incorporate nickel and manganese together in the atomic level, and thus a single phase is not easily obtained. On the contrary, if the mixture powder of the three kinds of elements described above comprises sufficiently fine particles, as fine as 0.3 μm or less, for example, a single phase can be obtained as long as observed from the X-ray diffraction pattern.

Moreover, it has been found that a more ideal oxide is obtainable by coprecipitation method as follows compared with that obtained by the dry mixing sintering method described above.

Recent research has revealed that wet coprecipitation method can provide good results when employed for production of a nickel composite oxide. For example, a nickel-manganese coprecipitation method is disclosed in Japanese Laid-Open Patent Publication No. 8-171910. The coprecipitation method is a technique of precipitating two elements simultaneously in an aqueous solution by use of neutralizing reaction to obtain a composite hydroxide as a precursor. So far, a normal coprecipitation method is sufficient for the conventional use of replacing a part of nickels with a small amount of another element. However, the conventional method is useless for the purpose of the present invention because a higher-level technology is required to incorporate both the nickel element and the manganese element in substantially the same amount in the atomic level. Moreover, when the hydroxide as the precursor obtained by the coprecipitation method is made to react with lithium to obtain the target lithium-containing composite oxide, the electrochemical properties of the resultant battery largely vary with the particle shape of the composite oxide. The conventional method finds difficulty in controlling the variation. In addition, the sintering temperature should be appropriately selected because it largely affects the electrochemical properties.

That is to say, the coprecipitation method is preferred for incorporating two kinds of transition metal elements together in the atomic level. When two kinds of transition metal elements are to be incorporated by the coprecipitation method, they are in the form of ions (divalent ions when the elements are nickel and manganese) in an aqueous solution. It is desirable for the two elements to be present with keeping the same valence and be coprecipitated by neutralization with a simultaneously dropped alkali. However, when the two transition metal elements are nickel and manganese, manganese is so susceptible to oxidation that it is oxidized even with a trace amount of dissolved oxygen existing in the aqueous solution to become trivalent ions. Due to the resultant mixed presence of divalent ions and trivalent ions, sufficient incorporation of the elements in the atomic level cannot be achieved.

According to the present invention, to suppress the occurrence described above, dissolved oxygen is removed by bubbling inert gas such as nitrogen or argon in the aqueous solution, or an antioxidant (reducing agent) such as hydrazine is added to the aqueous solution in advance. Thus, the present invention is distinguished from the prior art in that the coprecipitation is performed in an inert atmosphere.

To attain a layered structure for the crystal structure of crystalline particles of an oxide containing two kinds of transition metal elements and also attain a cubic closest packing structure for oxygen atoms constituting the oxide, in an oxidation atmosphere, for example, the oxide is sequentially subjected to primary sintering (400 to 650° C. when lithium salt is lithium hydroxide, 600 to 650° C. when lithium salt is lithium carbonate), pulverization as required, secondary sintering (950 to 1000° C.) and tertiary sintering (700 to 800° C.).

The oxide having the crystal structure described above exhibits the properties that the integral intensity ratio $I_{003}/I_{104}$ of the X-ray diffraction peak attributed to Miller indices (003) to that attributed to Miller indices (104) satisfies $I_{003}/I_{104} < 1$ and that the powder X-ray diffraction peaks attributed to Miller indices (108) and (110) are observed as two split peaks.

According to the present invention, selection of nickel and manganese as the especially preferred combination of transition metal elements has important meaning, which is different from the addition of a trace amount of various elements for improvement of $LiNiO_2$ as in the prior art.

The ratio of the two kinds of transition metal elements is ideally 1:1. No compound having this ratio has yet been commercialized. The synthesis method in the present invention is an improved coprecipitation method and further has some contrivance in the sintering conditions. The particle shape of the resultant active material and even the electrochemical properties thereof vary with the coprecipitation conditions and the subsequent sintering conditions and, therefore, conditions suitable for the purpose may be selected.

The production of a positive active material by the coprecipitation method will be described in more detail below. FIG. 1 is a schematic view of an experimental apparatus used for this production. As the raw materials, nickel sulfate and manganese sulfate were used.

A mixed solution of each 1.2 mol/liter of an aqueous $NiSO_4$ solution and an aqueous MnSO4 solution, 4.8 mol/liter of an aqueous NaOH solution, and 4.8 mol/liter of an aqueous $NH_3$ solution are put in a reaction bath 1 simultaneously at a rate of 0.5 milliliter/min. A cylindrical tube 2 is placed in the reaction bath 1, and an agitating rod 3 is provided inside the tube.

A hydroxide as a precursor is obtained by coprecipitation inside the tube. At the same time, downward force (toward the bottom of the reaction bath) is applied with the agitating rod placed inside the tube. With this force, microcrystals of the hydroxide obtained collide with one another, to grow crystals. In this way, crystalline particles are formed.

The particles pass outside the tube and are taken out from the system by overflow. The resultant particles have been made substantially spherical with the force during collision and the like. The temperature in the reaction bath is kept at 30 to 50° C.

If dissolved oxygen exists in the aqueous solution, manganese is very easily oxidized changing from divalent to trivalent. Therefore, when it is intended to obtain β type $Ni_{1-x}Mn(OH)_2$, such dissolved oxygen must be purged from the reaction bath by taking measures such as bubbling inert gas such as nitrogen or argon or adding some reducing agent, to thereby suppress oxidation of manganese.

On the contrary, when it causes no problem to obtain, or rather it is intended to obtain, α type $Ni_{1-x}Mn_x(OH)_2 \cdot xSO_4^{2-} \cdot yH_2O$, the dissolved oxygen in the solution may be effectively used.

According to experiments performed by the present inventors, it has been found from the results of X-ray diffraction images that a hydroxide with higher crystallinity is obtained in a low-temperature range of about 30° C. This type of reaction bath permits continuous high-speed production of a composite hydroxide and therefore is very useful from the industrial point of view. However, the particle size distribution of the resultant particles is wide, and thus particles with various sizes are mixed.

In addition, the large spherical particles having a size exceeding 10 μm tend to remain on the bottom of the reaction bath and thus are less easily taken out and, for this reason, care must be taken not to form such large size particles.

Figure 2:
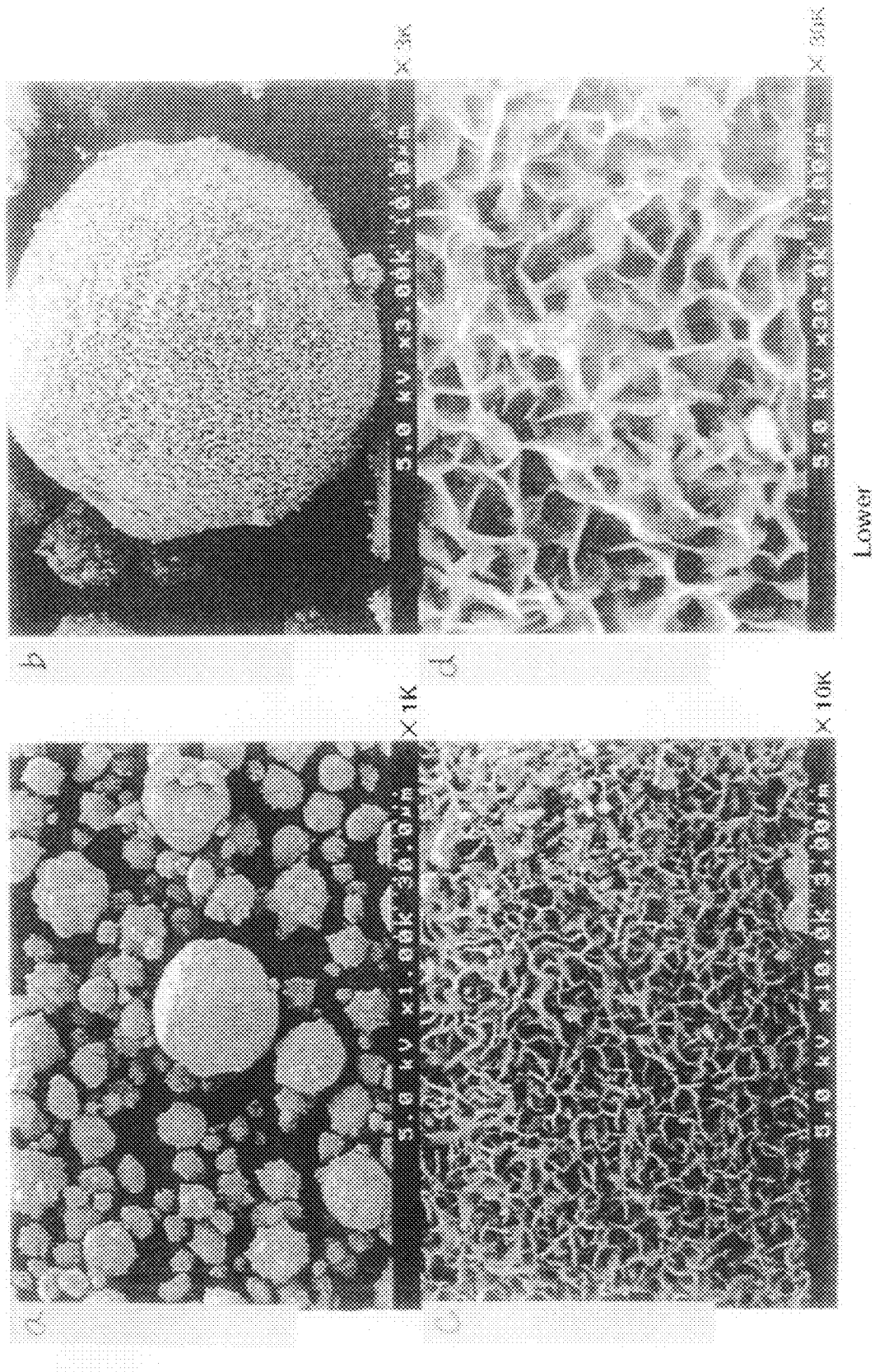
FIG. 2 shows scanning electron microscope (SEM) photographs of the surface of a precursor prepared according to the present invention.

FIG. 2 shows scanning electron microscope (SEM) photographs of the surface of a typical particle obtained with the reaction bath described above.

Figure 3:
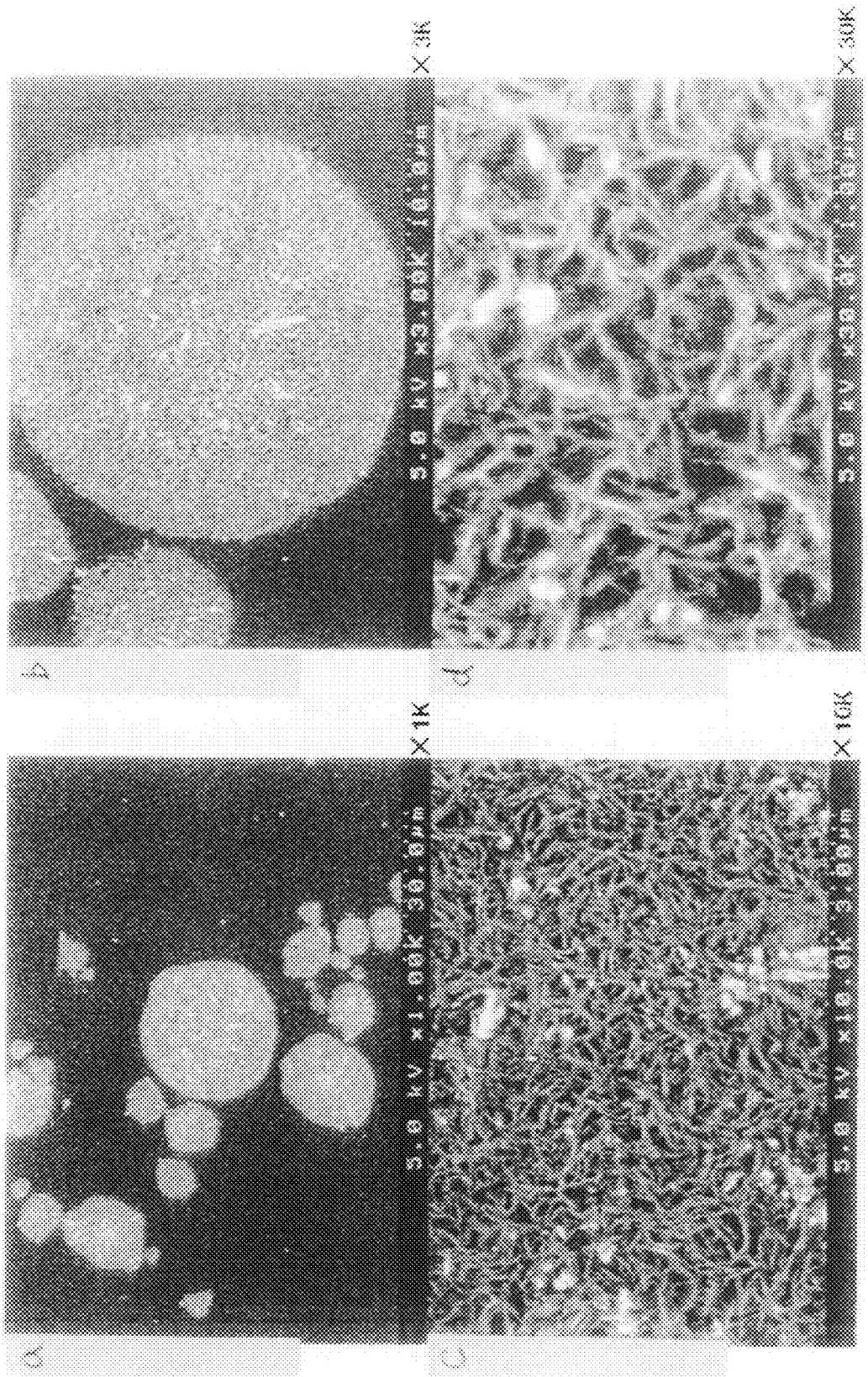
FIG. 3 shows SEM photographs of a section of the precursor prepared according to the present invention.

FIG. 3 shows SEM photographs of the section of a typical particle obtained with the reaction bath. The magnifications of these photographs are 1000×, 3000×, 10000× and 30000×.

From (a) and (b) of FIGS. 2 and 3, it is found that the particle is substantially spherical. From (C) and (d) of FIG. 2, it is found that the surface of the particle has projections and depressions uniformly like crimps and that the particles are porous. From the SEM photographs of FIG. 3, it is found that the uniform crimps on the surface are also observed inside the particles and that the particles are porous having roughly uniform sized pores. For reference, an example of the results of chemical analysis (element analysis) of the resultant composite hydroxide is shown in Table 1.

TABLE 1

| Composition | |
|---|---|
| Ni(%) | 31.7 |
| Ni(mol/g) | 0.00540 |
| Co(%) | 0.054 |
| Fe(%) | 0.053 |
| Cu(%) | ≦0.001 |
| Mn(%) | 28.5 |
| Mn(mol/g) | 0.00519 |
| Na(%) | 0.17 |
| Cl(%) | ≦0.05 |
| $SO_4$(%) | 0.073 |
| Tap density (g/cc) | 0.65 |
| Bulk density (g/cc) | 0.44 |
| Particle size (μm) | 12.0 |
| Mn:Ni ratio | 0.98:1.02 |

Figure 4:
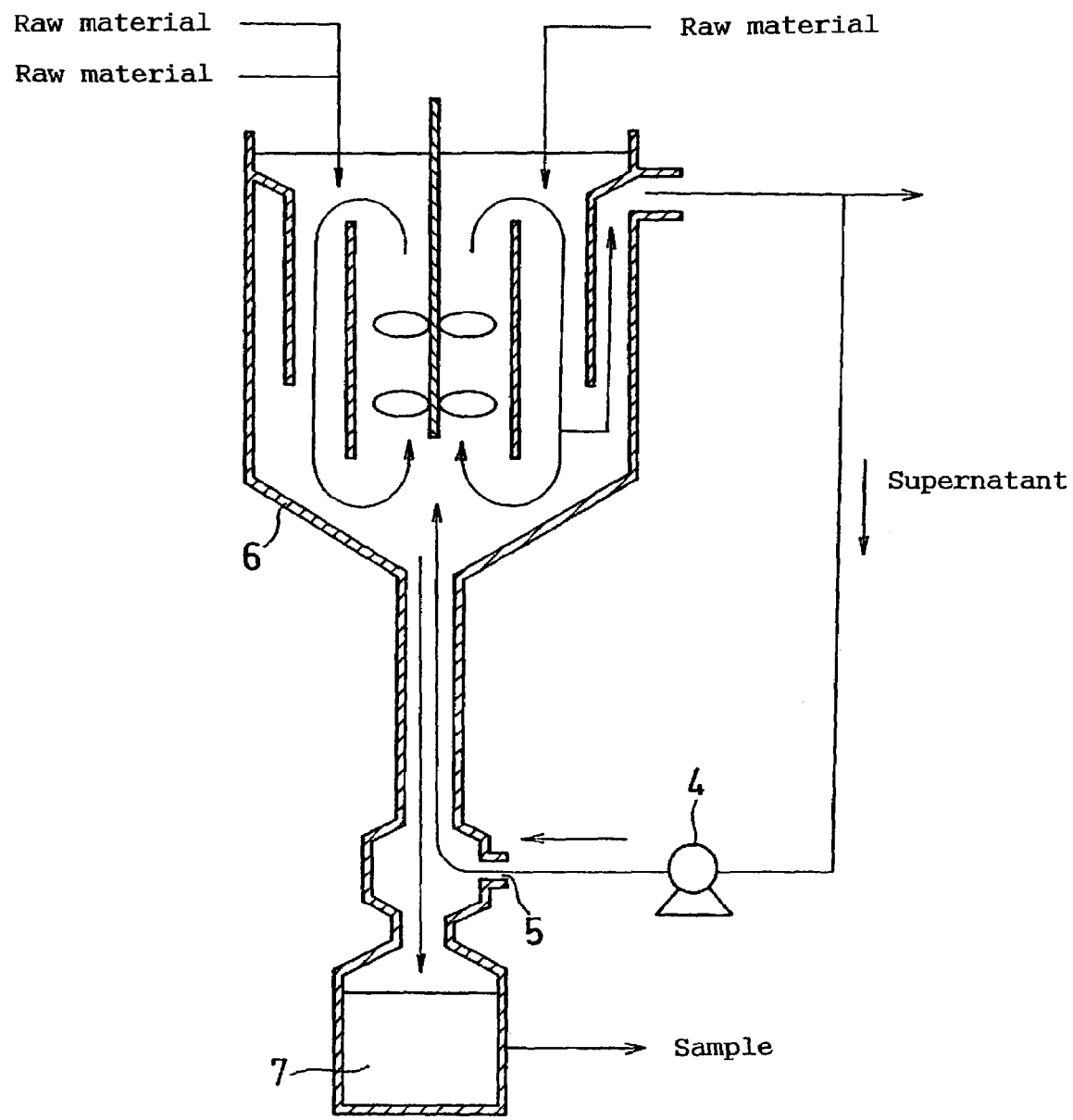
FIG. 4 is a schematic view of another experimental apparatus used for producing a positive electrode active material by coprecipitation method according to the present invention.

To obtain a spherical composite hydroxide with a higher density and a larger particle size, the production method may be modified as follows. FIG. 4 shows a schematic view of a modified experimental apparatus. In the apparatus shown in FIG. 4, a mixed solution is led into a reaction bath 6 via a feed inlet 5 with a pump 4, to allow the mixed solution to flow upward from bottom and collide with microcrystals precipitating by coprecipitation. A material collector 7 is placed in the lower portion of the apparatus. Therefore, in the above system, crystalline particles having an increased specific gravity, of which crystallization has developed to some extent, drop to finally reach the collector 7 in the lower portion and, however, immature crystalline particles are pressed back upward with the force of the solution flowing upward from the lower portion, to thereby be prevented from dropping to the lower portion.

By the above method, a high-density composite hydroxide having a large particle size of 10 to 20 μm and a tap density of 2.2 g/cm$^3$ can be obtained.

Figure 5:
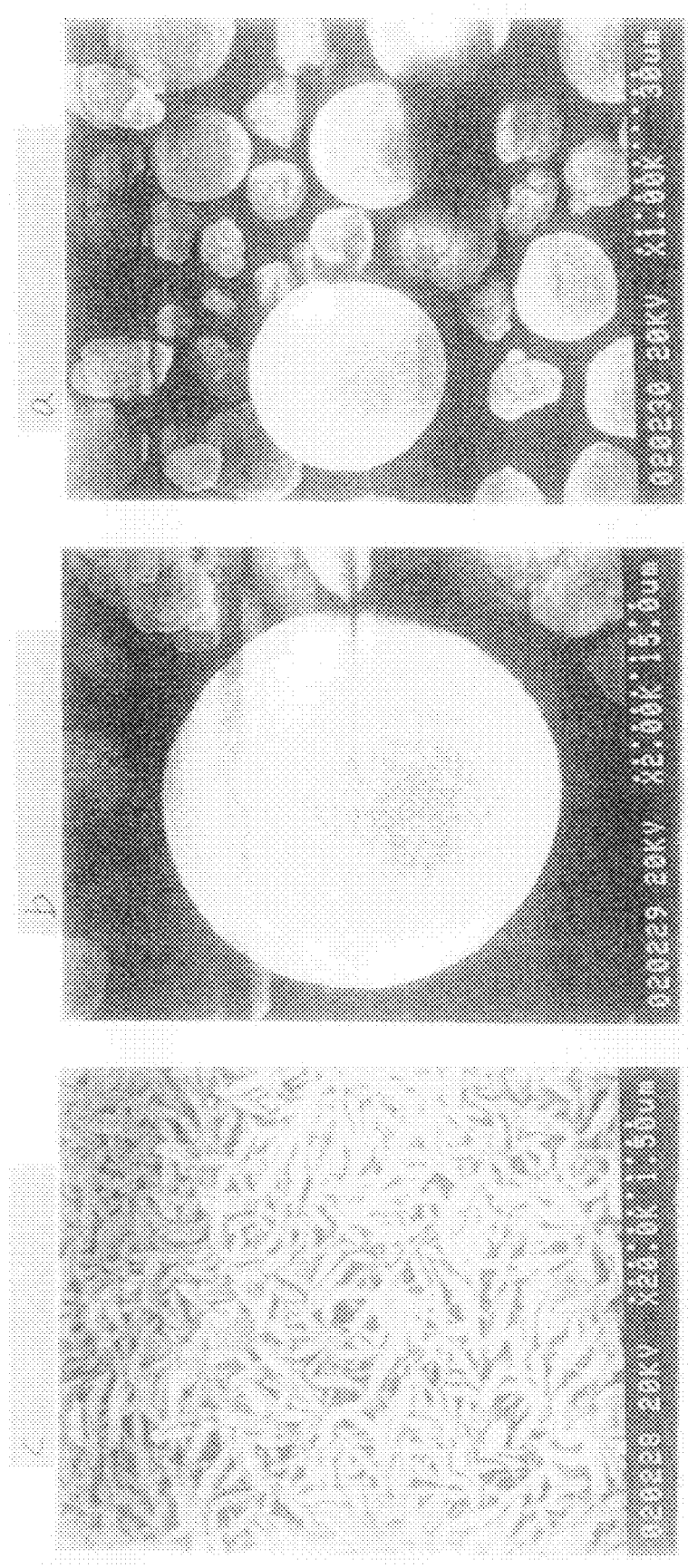
FIG. 5 shows SEM photographs of a precursor prepared according to the present invention.

FIG. 5 shows typical SEM photographs of particles obtained by the method described above. FIGS. 5(a), (b) and (c) are SEM photographs of 1000×, 2000× and 20000×, respectively. It is found that a large spherical particle filled with crystallites at high density is formed, which is a little different from the porous particle described above. Although the crystalline particles may be left in the state of hydroxide, they may be dried/sintered at a low temperature to be changed an oxide if change with time during preservation may cause a problem.

As described above, according to the present invention, both porous spherical particles and high-density spherical particles can be produced by changing the conditions of the coprecipitation depending on the use. Moreover, the particle size can be freely controlled from a small size to nearly 20 μm. The crystallinity, which can be observed by means of X-ray, can also be controlled by appropriately changing the temperature of the reaction bath.

Thereafter, the resultant hydroxide or oxide as the precursor is mixed with a lithium source such as lithium hydroxide, and the mixture is sintered, to thereby obtain $Li_yNi_{1-x}Mn_xO_2$ as the target positive electrode active material for lithium secondary batteries.

As the lithium source, lithium hydroxide may be used. When the use of lithium carbonate was examined, the target single phase was obtained and, however, lithium hydroxide was superior to lithium carbonate in the aspects of control of the particle shape, the crystallinity and the like.

It is desirable to supply lithium uniformly to reach the inside of the spherical nickel-manganese hydroxide (precursor). The use of lithium hydroxide is idealistic in this respect, because lithium hydroxide is melted first at a relatively low temperature, lithium is supplied into the inside of the particles of the nickel-manganese hydroxide, and then, oxidation gradually occurs from outside of the particles with increase of the temperature.

When lithium carbonate is used, decarboxylation must be undergone once, which occurs at a high temperature compared with the case of use of lithium hydroxide. Therefore, decarboxylation and oxidation occur roughly at the same time. This is considered the reason for the superiority of lithium hydroxide in the aspects of control of the particle shape and the crystallinity.

Next, preferred sintering conditions will be described.

The nickel-manganese composite hydroxide as the precursor and lithium hydroxide are mixed sufficiently in the dry state. It is ideal to mix lithium hydroxide and the nickel-manganese hydroxide so that the atomic ratio of Li to Ni and Mn satisfies Li/(Ni+Mn)=1. However, for control of the sintering temperature and the particle shape, the amount of one element may be somewhat increased or decreased. For example, when the sintering temperature is high, or when it is desired to increase the size of primary particles after sintering, the amount of lithium to be mixed may be somewhat increased. An increase/decrease by about 3% is preferable.

A further preferred precursor will be described. The preferred state of this precursor can be identified from the half-width of a low-angle peak observed with X-ray diffraction and the peak pattern intensity ratio. It is noted that the present invention is sometimes described in detail using nickel, manganese and cobalt as representatives of the transition metal elements, but a preferred precursor can also be obtained using other transition metal elements.

Figure 6:
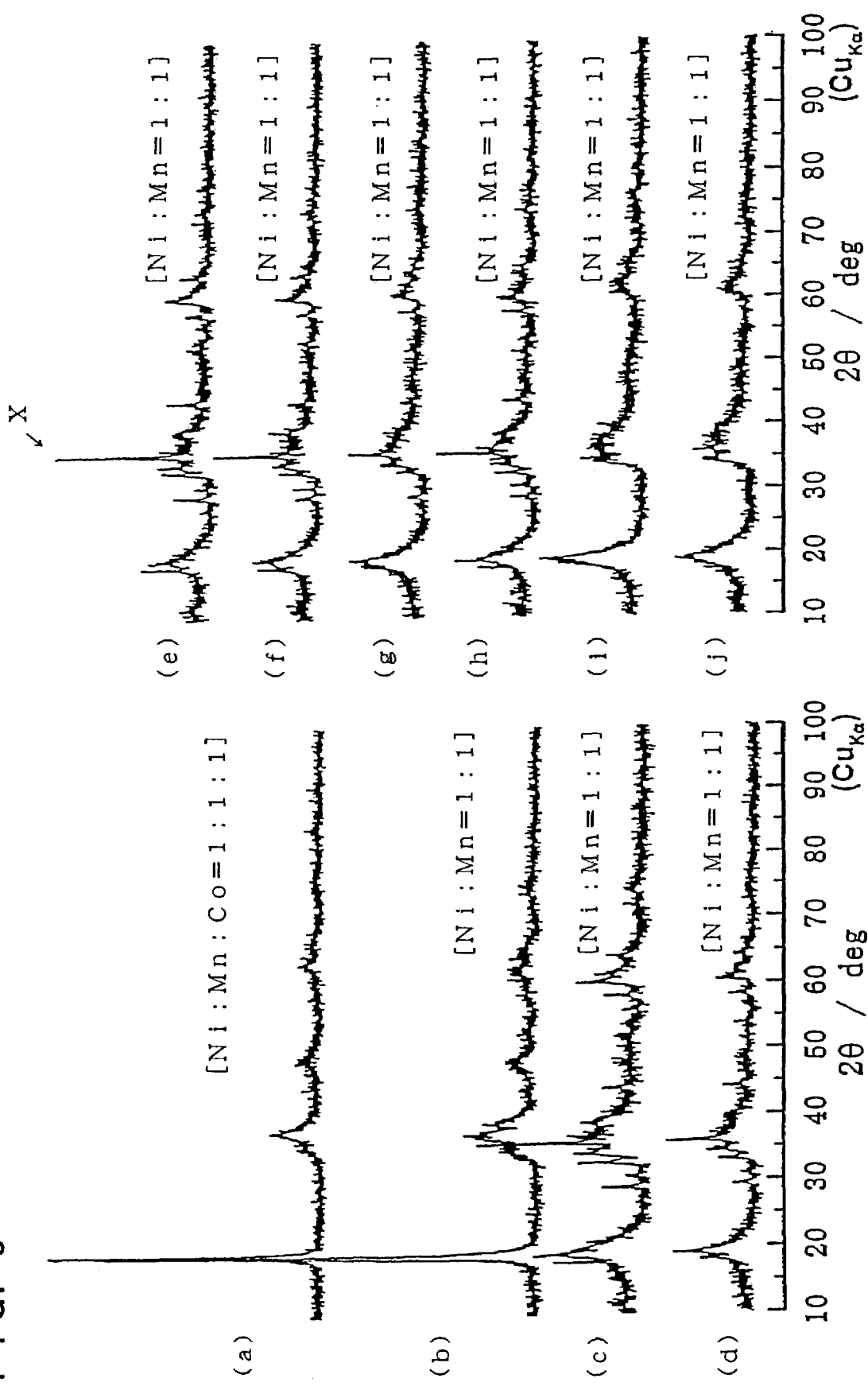
FIG. 6 shows X-ray diffraction patterns of precursors prepared under various conditions in examples and comparative examples of the present invention.

FIG. 6 shows X-ray diffraction patterns of precursors prepared under various conditions. For preparation of these precursors, it is preferable to take measures such as bubbling inert gas such as nitrogen or argon in the aqueous solution to remove dissolved oxygen or adding an antioxidant (reducing agent) such as hydrazine to the aqueous solution in advance, during the coprecipitation described above. With progress of the reduction, the hydroxide as the precursor may possibly become magnetic. When this occurs, the magnetism should preferably be removed by applying magnetic field or the like.

The added amount of hydrazine varies with the conditions such as the size of the reaction bath, the temperature, the pH, the stirring speed, the concentration of the reactant, and the like. Those skilled in the art would be able to conduct appropriate control to obtain the X-ray diffraction patterns described above.

In FIG. 6, (a) represents a material obtained by eutectic reaction of Ni, Mn and Co at 1:1:1, and (b) to (j) represent materials obtained by eutectic reaction of Ni and Mn at 1:1. In observation of these peak patterns, it is found that there are two significant differences between the group of (a) and (b) and the group of the other items.

The first difference is that, in (c) to (j), a very sharp peak exists at 36°. In particular, the peak in (e) is particularly sharp and very recognizable.

The peak patterns (c) to (j) have broad peaks as a whole, but locally have a sharp peak X (see FIG. 6) as is typically observed in (e). These peaks are considered attributed to manganese oxides, in particular, $Mn_2O_3$, and are indicated in No. 330900 of JCPDS card.

Therefore, in an oxide or a hydroxide obtained by eutectic reaction of nickel and manganese with/without cobalt, it is preferable that the elements are mixed in the atomic level, but there is the possibility that uneven distribution already exists at this time. It has been found that if an oxide or a hydroxide having such an observable $Mn_2O_3$ peak is used, the resultant battery decreases in capacity, as will be described later in Examples.

The second difference is that in (a) and (b), the peak half-width observed in the range of 15 to 20° is small compared with that in the others. In addition, in the analysis of (a) to (j) in FIG. 6, it is found that the height $H_1$ of the peak observed in the range of 15 to 20° is extremely high compared with the height $H_2$ of the peak observed in the range of 30 to 40°, satisfying the relation:

$$H_1 \geq 2 \times H_2$$

The difference described above indicates that in (a) and (b) the crystallinity has already developed to some extent in the precursor. This is easily recognized by comparing (a) and (b) with (i) and (j). In (i) and (j), although there is no evident $Mn_2O_3$ peak, the peak intensity ratio and the half-width are clearly different from those in (a) and (b).

Conventionally, in some cases, the performance of actually produced positive electrode active materials and batteries using these materials vary subtly depending on the lot although they are produced under the same conditions. However, by using the precursor of the present invention having the pattern shown in (a) or (b) for synthesis of a positive electrode active material composed of a lithium-containing transition metal oxide, it is possible to provide a positive electrode active material with which the resultant batteries are small in capacity variation regardless of the lot and also small in capacity deterioration rate.

To obtain the positive electrode active material having a specific structure, it is ideal to satisfy Li/(Ni+Mn)=1, and it is also possible to increase this ratio for various purposes to be described later. That is, a lithium-containing oxide expressed by formula (2):

$$Li[Li_x(Ni_{1/2}Mn_{1/2})_{1-x}]O_2$$

wherein $0 \leq x \leq 0.3$. If the atomic ratio of lithium in the lithium-containing oxide is further increased, the electric capacity as the active material decreases and also synthesis of the target layered-structure active material tends to fail. Therefore, it is preferable to satisfy $0 \leq x \leq 0.3$, and particularly preferable to satisfy $0.03 \leq x \leq 0.25$. The atmosphere for sintering may be an oxidation atmosphere. In this examination, the ordinary atmosphere was used.

As an example, three kinds of lithium-containing oxides expressed by formula (2) in which x was 0.1, 0.2 and 0.3, respectively were synthesized. In the synthesis, the amount of lithium hydroxide was adjusted to attain each of the above ratios when a nickel-manganese composite hydroxide as the precursor prepared by the coprecipitation method and lithium hydroxide were mixed sufficiently in the dry state. The resultant oxide was subjected to primary sintering at 500° C. for 8 hours, pulverization with Masscolloider, secondary sintering at 950° C. for 10 hours, and tertiary sintering at 700° C. for 5 hours, to have the specific crystal structure described above. It is possible to confirm that the crystal structure of crystalline particles of the oxide is a layered structure and that oxygen atoms constituting the oxide form a cubic closest packing structure, by analyzing the pattern of the powder X-ray diffraction image with the Rietveld method.

Figure 7:
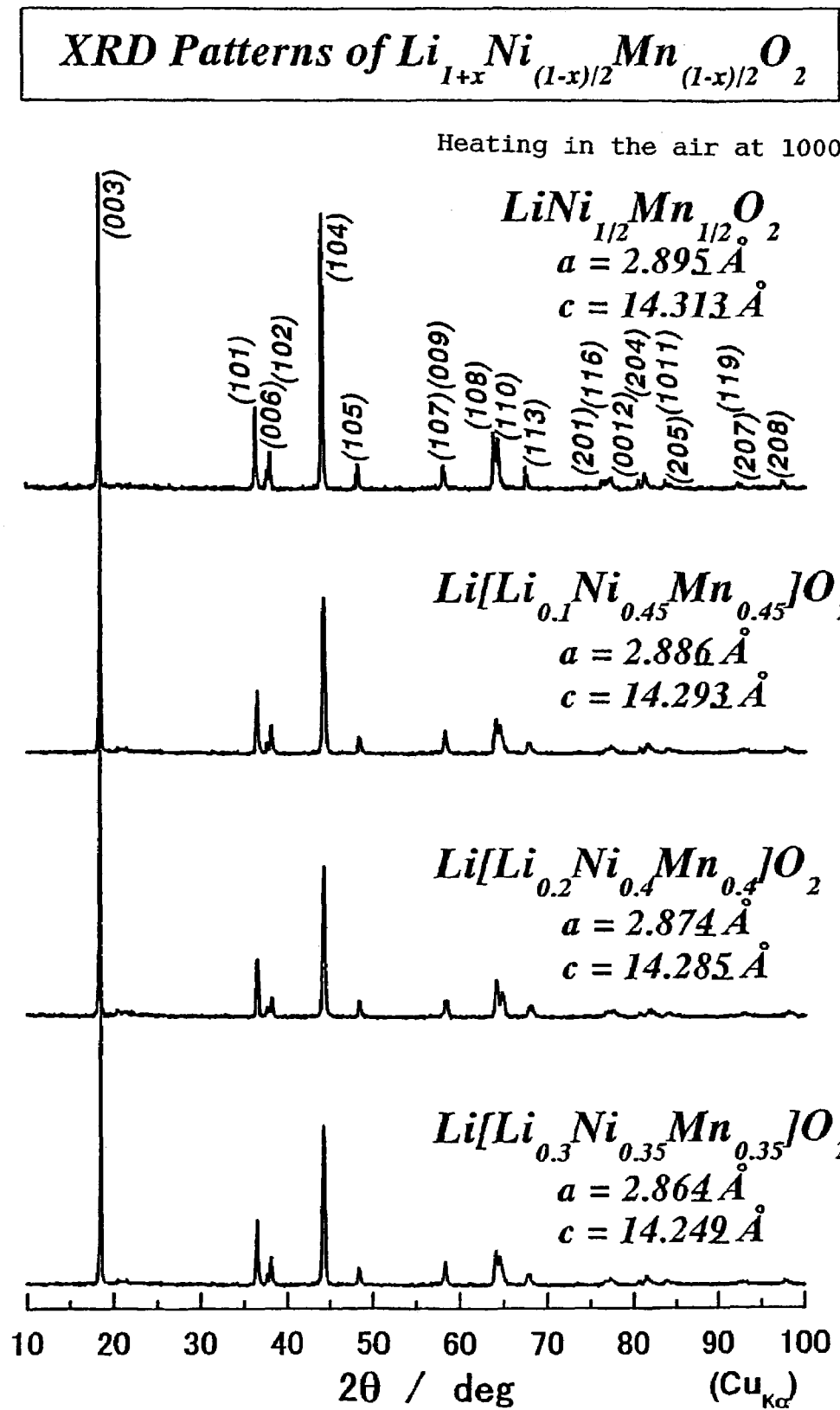
FIG. 7 show X-ray diffraction images of lithium-containing nickel-manganese oxides having various compositions.

FIG. 7 shows X-ray diffraction images of the resultant active materials. As is clear from FIG. 7, for all the cases of the value of x being 0.1, 0.2 and 0.3, substantially the same X-ray diffraction pattern as that obtained when Li/(Ni+Mn)=1 demonstrated in the top of the figure was observed. That is, the crystal structure is roughly the same for all the cases.

However, with increase of the (003) peak, the (003) to (104) peak intensity ratio varies. As a result, the range of the integral intensity ratio $I_{003}/I_{104}$ of the X-ray diffraction peak attributed to (003) to that attributed to (104) may be somewhat deviated from $I_{003}/I_{104}<1$.

The above deviation is considered caused by, not change in crystal structure, but a subtle change in dispersion intensity ratio due to the change of the ratio of the lithium element to the transition metals. Both the a-axis length and the c-axis length decreased with the increase of the ratio of the lithium element to the transition metals.

(3) Properties of Positive Electrode Active Material of the Present Invention

Next, the electrochemical properties of the resultant positive electrode active materials were evaluated by producing coin-shaped batteries.

Coin-shaped batteries were produced in the following manner. Each of the positive electrode active materials obtained by sintering at various temperatures, acetylene black as a conductive material, and a polyvinylidene fluoride resin (PVDF) as a binder were mixed at a weight ratio of 80:10:10, to obtain a sheet-shaped molded article. The molded article was stamped into a disk shape and dried under vacuum at 80° C. for about 15 hours, to obtain a positive electrode. Also, a sheet-shaped lithium metal was stamped into a disk shape, to obtain a negative electrode. A polyethylene microporous film was used as a separator, and 1 mol of $LiPF_6$ was dissolved in a mixed solvent of ethylene carbonate (EC) and ethyl methyl carbonate (EMC) at 1:3 (volume ratio) to prepare an electrolyte.

Coin-shaped batteries of 2016 size (20 mm in diameter and 1.6 mm in thickness) were produced using the above materials by a normal method. The produced coin-shaped batteries were repeatedly charged/discharged in the range of 3.0 to 4.5 V at a constant current value equivalent to the 10 hour rate. As a result, in all the cases, an initial charge/discharge capacity of 150 mAh/g or more was obtained and the discharge voltage was in the level of 4 V.

Figure 8:
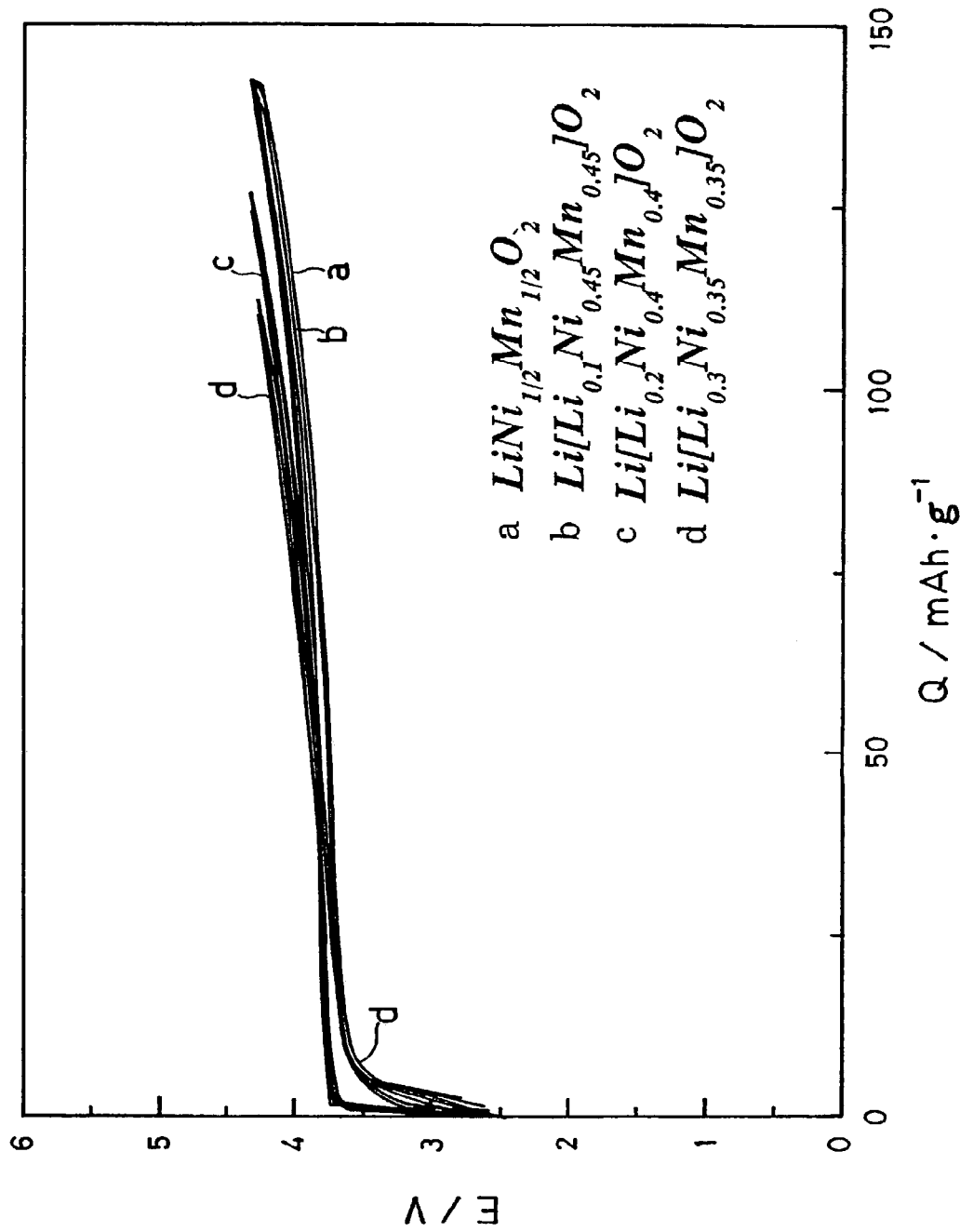
FIG. 8 is a view showing charge/discharge curves of $Li[Li_x(Ni_{1/2}Mn_{1/2})_{1-x}]O_2$ wherein x is 0.1, 0.2 and 0.3, respectively.

FIG. 8 shows charge/discharge curves, in the overlap state, of $Li[Li_x(Ni_{1/2}Mn_{1/2})_{1-x}]O_2$ wherein x is 0.1, 0.2 and 0.3 as the positive electrode active materials having the specific structure of the present invention. From this figure, it is found that the charge/discharge potentials of these three materials are the same. Also, only the charge/discharge capacity varies in proportion of the total amount of the transition metals. From this, in addition to the X-ray diffraction patterns in FIG. 7, it is found that these three materials have the same structure. Moreover, using this feature, the charge/discharge capacity can be controlled by controlling the quantity of the lithium element in the material freely within this range while maintaining the charge/discharge potential constant. Thus, the present invention, which enables non-electrochemical synthesis of the material having such charge/discharge behavior, presents a guideline for novel material design.

Figure 9:
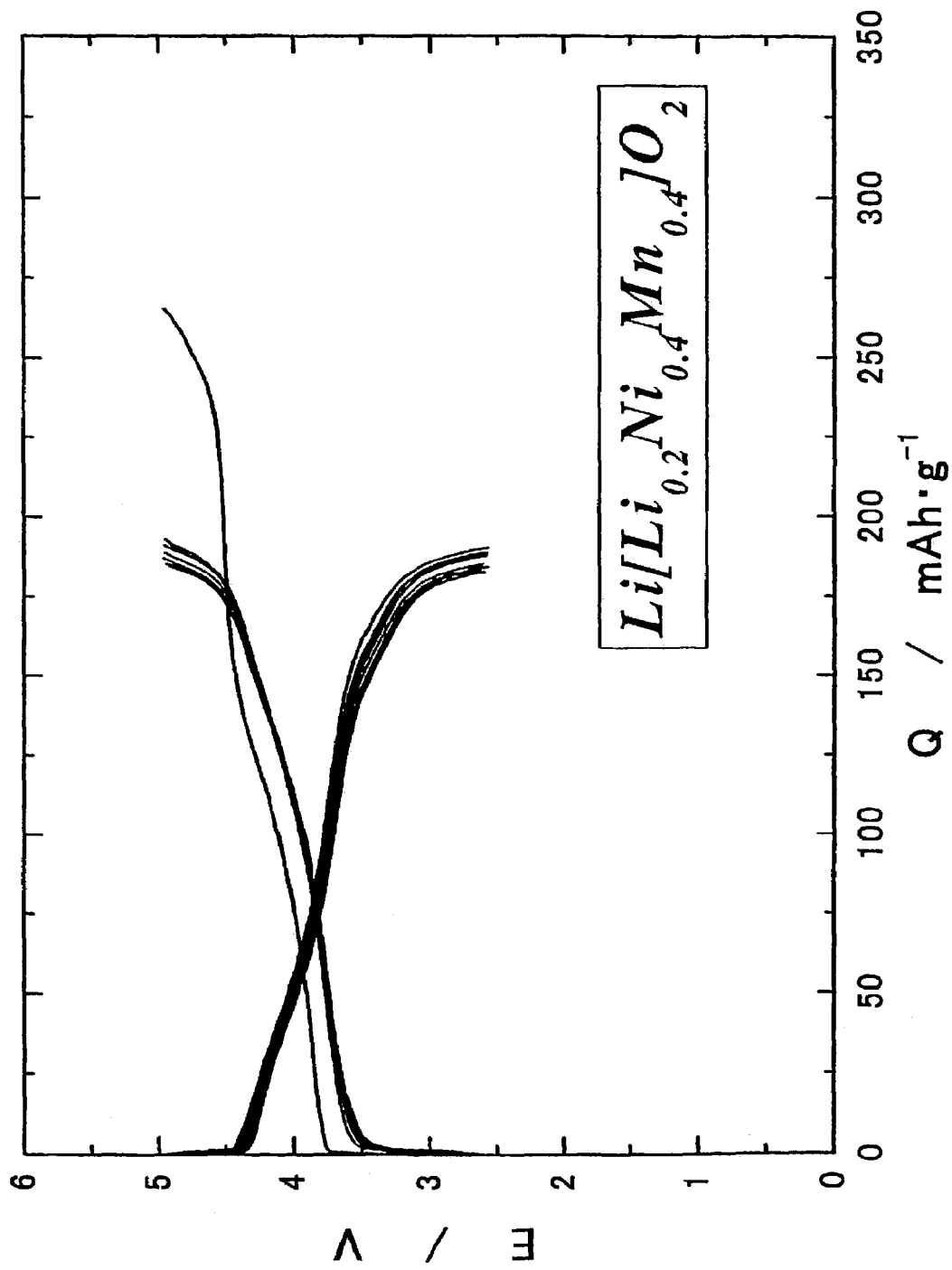
FIG. 9 is a view showing charge/discharge curves of $Li[Li_{0.2}(Ni_{1/2}Mn_{1/2})_{0.8}]O_2$ in the range of 5 to 2.5 V.

FIG. 9 shows charge/discharge curves of $Li[Li_{0.2}(Ni_{1/2}Mn_{1/2})_{0.8}]O_2$ in the range 5 to 2.5 V. This material is normally controlled to a potential up to 4.3 V with respect to the lithium metal for application to a battery. This also applies to generally available $LiCoO_2$. However, in the event of failure of this control, the material is overcharged, that is, charged up to near 5 V. Once in such an overcharged state, the crystal structure of $LiCoO_2$ becomes very unstable. This will be described later in Example 4 for the case of $LiNiO_2$, which also applies to the case of $LiCoO_2$. However, $Li[Li_{0.2}(Ni_{1/2}Mn_{1/2})_{0.8}]O_2$ largely changes it crystal structure by the first charge, to have a thermally stable structure. As is found from the charge/discharge curves shown in FIG. 9, a clear difference exists between the first charge behavior and the subsequent charge/discharge behavior. Entirely different behavior is also shown for the charge/discharge curve up to 4.3 V shown in FIG. 8.

The same results were obtained for the active material expressed by $Li[Li_{0.1}(Ni_{1/2}Mn_{1/2})_{0.9}]O_2$ and the active material expressed by $Li[Li_{0.3}(Ni_{1/2}Mn_{1/2})_{0.7}]O_2$. Therefore, from the results for $Li[Li_x(Ni_{1/2}Mn_{1/2})_{1-x}]O_2$ (X=0.1~0.3) containing lithium excessively as described above, there is found a merit that the thermal stability of the active material at an overcharge can be improved by the mechanism described above. No prior art discloses or suggests this idea, and thus the present invention presents a guideline for entirely novel material design.

Next, the difference of the present invention in which a new function is observed by mixing two kinds of transition metals in substantially the same proportion from the prior art in which stabilization of the structure is intended by adding a trace amount of some element to a material such as $LiNiO_2$ as the reference, will be described again based on the experiment results.

Conventionally, to prepare an active material having a 4V-class layered structure, it is generally attempted to combine Co and Ni, or add a trace amount of a third element to these elements for stabilization of the crystal structure while maintaining the potential-related features of these elements. These prior art techniques are clearly different from the present invention in which two kinds of elements are mixed in roughly identical proportion to develop a new function.

Figure 10:
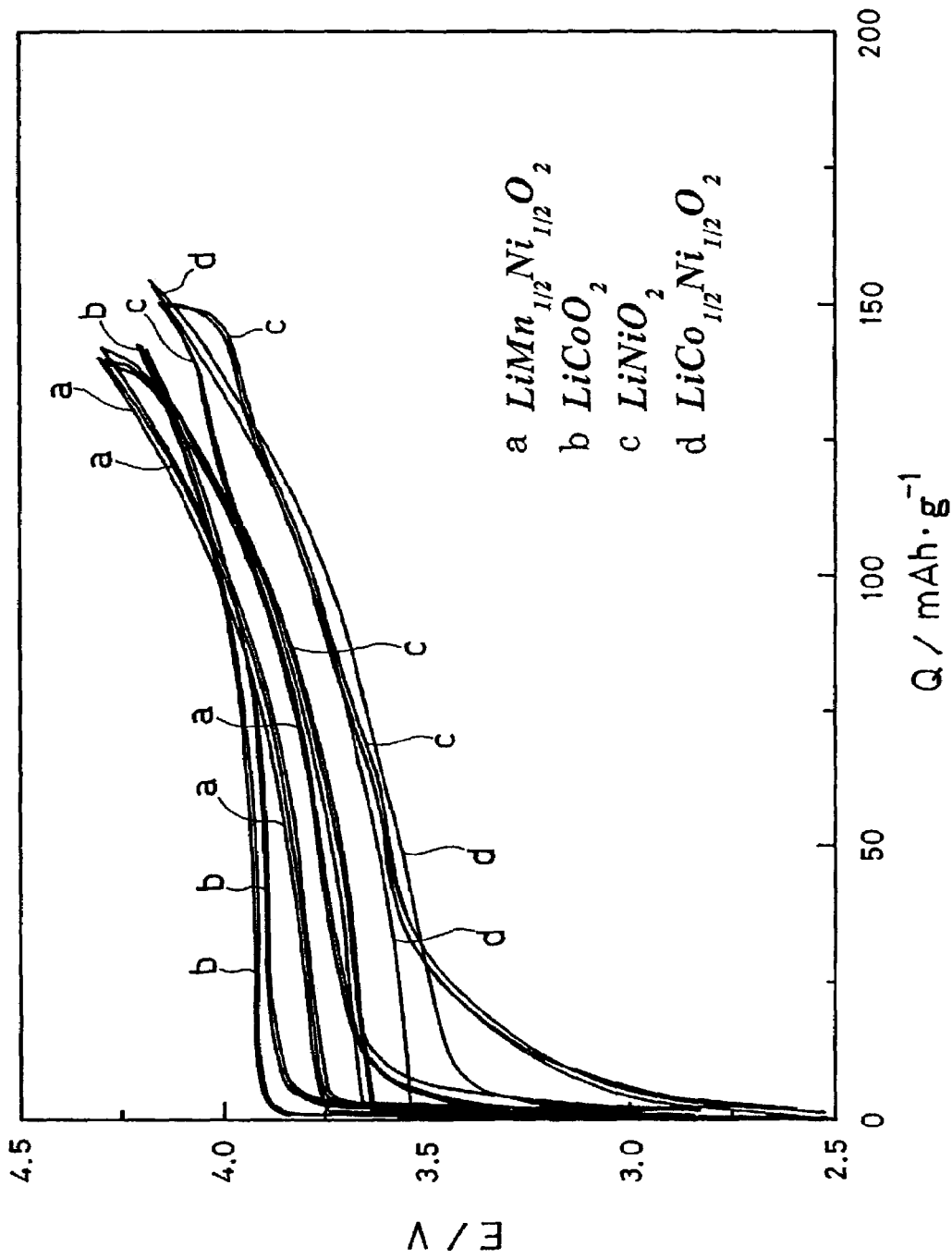
FIG. 10 is a view showing charge/discharge curves of lithium-containing oxides containing various transition metal elements.

To state more specifically, it is expected from the potentials of the prior art active material and active materials containing transition metal elements singly that the voltages of oxides containing Ni—Co, Ni and Ni—Mn will be higher in the order of Ni—Co>Ni>Ni—Mn. Actually, however, the voltages are higher in the order of Ni—Mn>Ni>Ni—Co, which is the reverse of the expected order. FIG. 10 shows an example of this phenomenon. Taking $LiNiO_2$ as the reference, the potential decreases when Co is added, while the potential increases when Mn is added, contrary to the expectation that it will decrease. From this result, also, it is clear that a new function can be developed by mixing two kinds of transition metals in the same proportion to synthesize an active material having a layered structure.

The research related to the present invention has been conducted focusing on $LiNi_{1-x}Mn_xO_2$. And, it has been clarified that a new function is developed when nickel and manganese are incorporated in each other in substantially the same proportion. It is easily predictable that added values will be obtained by further adding a further new element to the material.

For example, consider a material expressed by formula $LiNi_{1-x}Mn_xA_zO_2$. It is expected that by adding aluminum, magnesium, calcium, strontium, yttrium, ytterbium or the like as A in an adequate amount, the resultant material will improve in thermal stability. It is also expected that by adding another transition metal as A, the cycle life and the polarization will be improved. Further, by combining these elements, it is expected that these improvements are obtained simultaneously.

Figure 11:
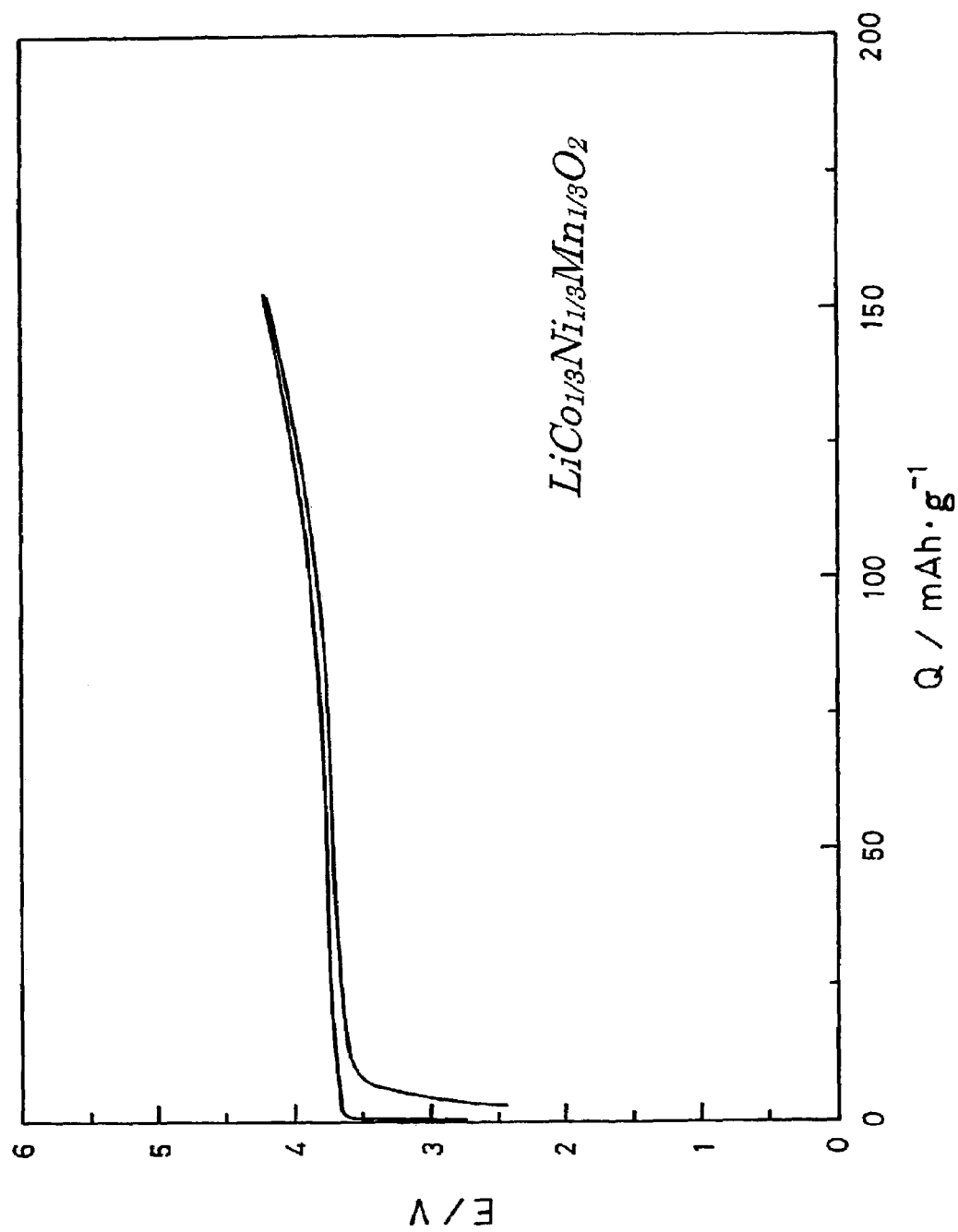
FIG. 11 is a view showing charge/discharge curves of $LiCo_{1/3}Ni_{1/3}Mn_{1/3}O_2$.

A specific example will be described. By addition of cobalt as a transition metal, the polarization can be improved. While the ratio of nickel to manganese of 1:1 was maintained because this ratio was important, cobalt of roughly the same quantity as that of each of nickel and manganese was added to these elements, to obtain an oxide expressed by formula $LiCo_{1/3}Ni_{1/3}Mn_{1/3}O_2$, and the charge/discharge curves of the resultant material were shown in FIG. 11. As is found from this figure, the polarization in the final stage of discharge decreases compared with the case of $LiNi_{1/2}Mn_{1/2}O_2$. Substantially the same effect was observed when iron was added.

It is known that thermal stability improves by addition of aluminum, which will be described in Examples to be described later.

It is effective to add any of these elements in an amount of 5 to 35 mol % with respect to the total amount of the added element and the transition metal elements. If the amount is less than 5 mol %, no sufficient effect will be obtained. If the amount exceeds 35 mol %, the capacity will disadvantageously decreases. The elements to be added other than cobalt are preferably added to only the surface portion of crystalline particles of the lithium-containing oxide.

(4) Non-Aqueous Electrolyte Secondary Battery

In the following, a description will be given of other constituent materials that can be used when fabricating a non-aqueous electrolyte (lithium) secondary battery using the positive electrode active material of the present invention.

The electrically conductive material used in the positive electrode material mixture for the production of the positive electrode of the present invention is not limited to a particular material, but any electronically conductive material can be used as long as the material does not cause any chemical change in the fabricated battery. Examples include: graphites such as natural graphite (scale graphite and the like) and artificial graphite; carbon blacks such as acetylene black, Ketjen black, channel black, furnace black, lamp black and thermal black; electrically conductive fibers such as carbon fiber and metallic fiber; metallic powders such as carbon fluoride powder, copper powder, nickel powder, aluminum powder and silver powder; electrically conductive whiskers such as zinc oxide whisker and potassium titanate whisker; electrically conductive metal oxides such as titanium oxide; and electrically conductive organic materials such as polyphenylene derivatives. These materials can be used alone or in any combination thereof within the scope that does not impair the effect of the present invention.

Among them, artificial graphite, acetylene black and nickel powder are particularly preferable. The amount of the electrically conductive material to be added is not particularly specified, but from 1 to 50% by weight is preferable, and from 1 to 30% by weight is particularly preferable. In the case of carbon and graphite, from 2 to 15% by weight is particularly preferable.

For the binder used in the positive electrode material mixture of the present invention, a polymer having a decomposition temperature of 300° C. or higher is preferable. Examples include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer. These materials can be used alone or in any combination thereof within the scope that does not impair the effect of the present invention.

Among them, polyvinylidene fluoride (PVDF) and polytetrafluoroethylene (PTFE) are most preferable.

The material, which constitutes the current collector for the positive electrode is not limited to a particular material, but any electronically conductive material can be used as long as the material does not cause any chemical change in the fabricated battery. The current collector may comprise, for example, stainless steel, nickel, aluminum, titanium, various alloys or carbons, or a composite material such as aluminum or stainless steel with the surface thereof treated with carbon, nickel, titanium or silver.

Among them, aluminum or an aluminum alloy is preferable. The surface of these materials may be treated with oxidization. Also, the surface of the collector may be roughened by surface treatment. As for the current collector shape, any shape commonly employed in the field of batteries can be used. Examples of the shape include a foil, a film, a sheet and a net, a punched sheet, a lath body, a porous body, a foamed body, fibers and a non-woven fabric. The thickness is not particularly specified, but the thickness of from 1 to 500 μm is preferable.

The negative electrode active material used in the present invention can comprise a compound, which can absorb and desorb a lithium ion, such as lithium, alloys such as lithium alloys, intermetallic compounds, carbon, organic compounds, inorganic compounds, metal complexes and organic polymer compounds. These materials can be used alone or in any combination thereof within the scope that does not impair the effect of the present invention.

As the lithium alloys, there are exemplified Li—Al based alloys, Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys, Li—Cd based alloys, Li—In based alloys, Li—Pb based alloys, Li—Bi based alloys, Li—Mg based alloys and the like. In this case, the lithium content is preferably 10% by weight or higher.

As the alloy and intermetallic compounds, there are compounds of a transition metal and silicon, compounds of a transition metal and tin and the like. A compound of nickel and silicon is preferable.

As the carbonaceous materials, there are coke, pyrolytic carbon, natural graphite, artificial graphite, mesocarbon microbeads, graphite mesophase particles, gas phase grown carbon, vitrified carbons, carbon fiber (polyacrylonitrile type, pitch type, cellulose type and gas phase grown carbon), amorphous carbon and carbons obtained by baking organic materials. These materials can be used alone or in any combination thereof within the scope that does not impair the effect of the present invention. Among them, graphite materials such as graphite mesophase particles, natural graphite, and artificial graphite are preferable.

It is to be noted that the carbonaceous material may contain, in addition to carbon, such dissimilar compounds as O, B, P, N, S, SiC and $B_4C$. The content of such material is preferably from 0 to 10% by weight.

As the inorganic compounds, there are tin compounds and silicon compounds for example, and as the inorganic oxides, there are titanium oxide, tungsten oxide, molybdenum oxide, niobium oxide, vanadium oxide and iron oxide for example.

As the inorganic chalcogenides, there are, for example, iron sulfide, molybdenum sulfide and titanium sulfide.

As the organic polymer compounds, there are, for example, polymer compounds such as polythiophene and polyacetylene. And as the nitride, there are, for example, cobalt nitride, copper nitride, nickel nitride, iron nitride and manganese nitride.

These negative electrode materials may be used in combination; for example, a combination of carbon and an alloy and a combination of carbon and an inorganic compound are possible.

The average particle size of the carbon material used in the present invention is preferably from 0.1 to 60 μm, and more preferably from 0.5 to 30 μm. The specific surface is preferably from 1 to 10 m$^2$/g. In terms of the crystal structure, graphite having a hexagonal lattice spacing ($d_{002}$) of carbon is from 3.35 to 3.40 Å and a size (LC) of the crystalline in the c-axis direction of 100 Å or larger, is preferable.

In the present invention, since the positive electrode active material comprises Li, a negative electrode material (carbon or the like) that does not comprise Li can be used. However, it is preferable to add a small amount of Li (about 0.01 to 10 parts by weight per 100 parts by weight of the negative electrode material) into such a negative electrode material with no Li, because if part of Li atoms becomes inactive by reacting with the electrolyte, for example, it can be supplemented with the Li added in the negative electrode material.

To add Li into the negative electrode material as thus described, Li is impregnated into the negative electrode material by applying a heated and melted lithium metal onto the current collector to which the negative electrode material is pressed and adhered, or Li is electrochemically doped into the negative electrode material by attaching a lithium metal in advance into an electrode group by pressing and adhering or other means and immersing the whole into an electrolyte solution.

The electrically conductive material used in the negative electrode material mixture is not limited to a particular material but, as in the case of the electrically conductive material used in the positive electrode material mixture, any electronically conductive material can be used as long as the material does not cause any chemical change in the fabricated battery. If the carbonaceous material is used for the negative electrode, the electrically conductive material need not necessarily be added because the carbonaceous material itself has electronic conductivity.

For the binder used in the negative electrode material mixture, either a thermoplastic resin or a thermosetting resin can be used, but a polymer having a decomposition temperature of 300° C. or higher is preferable.

Examples for the binding agent include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ether-tetrafluoroethylene copolymer. Among them, styrene-butadiene rubber and polyvinylidene fluoride are preferably used, and styrene-butadiene rubber is most preferably used.

The material of the current collector for the negative electrode is not limited to a particular material, but any electronically conductive material can be used as long as the material does not cause any chemical change in the fabricated battery.

As the material constituting the current collector, there are, for example, stainless steel, nickel, copper, titanium, carbon, a material such as copper or stainless steel with the surface treated with carbon, nickel, titanium or silver, or an Al—Cd alloy. Among them, copper or a copper alloy is preferable. The surface of these materials may be treated with oxidization. Also, the surface of the collector may be roughened to form convex and concave by surface treatment.

As for the current collector shape, a foil, a film, a sheet, a net, a punched sheet, a lath body, a porous body, a foamed body, or fiber molding can be used, as in the case for the above positive electrode. The thickness is not particularly specified, but the thickness between 1 μm and 500 μm is preferable.

In addition to the electrically conductive material and the binder, a filler, a dispersing agent, an ion conducting material, a pressure reinforcing agent, and other various additives may be added in the electrode material mixture. Any fibrous material can be used for the filler as long as it does not cause any chemical change in the fabricated battery. Usually, a fiber comprising an olefin polymer fiber such as polypropylene or polyethylene, a glass fiber or a carbon fiber is used. The amount of the filler to be added is not particularly specified, but from 0 to 30% by weight is preferable.

The positive electrode and negative electrode used in the present invention may each have, in addition to the mixture layer containing the positive electrode active material or negative electrode material, other layers such as a base coat layer intended, for example, to improve the adhesion between the collector and the mixture layer, the electrical conductivity, the cycle characteristics, and the charge/discharge efficiency, and a protective layer intended for mechanical and chemical protection of the mixture layer. The base coat layer and the protective layer may contain a binder or electrically conductive material particles or electrically non-conductive particles.

An insulating microporous thin film having a large ion permeability and a specified mechanical strength may be used as the separator. Preferably, the film has the function of closing the pores and increasing the resistance at a temperature of 80° C. or higher. A sheet or non-woven fabric made of an olefin polymer such as polypropylene or polyethylene alone or in combination thereof, or made of glass fiber is used because of the resistances thereof to an organic solvent and hydrophobicity.

It is desirable that the pore diameter of the separator be made small enough to prevent the active material, the binder, the conductive material and the like separated from the electrode sheet from passing through the separator; for example, a diameter of from 0.1 to 1 μm is desirable. As for the separator thickness, a thickness of from 10 to 300 μm is usually preferable. Porosity is determined in accordance with the electron or ion permeability, the material used, the film thickness and the like, and generally a porosity of from 30 to 80% is desirable. Further, when a flame retardant or nonflammable material such as glass or metal oxide film is used, the safety of the battery is further enhanced.

The non-aqueous electrolyte used in the present invention comprises a solvent and a lithium salt dissolved in the solvent. The preferable solvent is one ester or an ester mixture. Above all, cyclic carbonates, cyclic carboxylic acid esters, non-cyclic carbonates, aliphatic carboxylic acid esters and the like are preferably exemplified. Further, solvent mixtures of cyclic carbonates and non-cyclic carbonates, solvent mixtures of cyclic carboxylic acid esters, and solvent mixtures of cyclic carboxylic acid esters and cyclic carbonates are preferably exemplified.

Other solvents to be used in concrete examples of the aforesaid solvents and in the present invention will be exemplified as follows:

Esters, which may be used as the non-aqueous solvent include, for example, cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethyl methyl carbonate (EMC), and dipropyl carbonate (DPC), aliphatic carboxylic acid esters such as methyl formate (MF), methyl acetate (MA), methyl propionate (MP) and ethyl propionate (MA), and cyclic carboxylic acid esters such as γ-butyrolactone (GBL).

For cyclic carbonates, EC, PC, VC and the like are particularly preferable; for cyclic carboxylic acid esters, GBL and the like are particularly preferable; and for non-cyclic carbonates, DMC, DEC, EMC and the like are preferable. Further, aliphatic carboxylic acid esters may also be preferably used, if occasion demands. Preferably, the aliphatic carboxylic acid ester is contained in an amount of 30% or less, and more preferably 20% or less, of the total weight of the solvent.

The solvent in the electrolyte solution of the present invention may contain known aprotic organic solvents, in addition to the above esters in an amount of 80% or more.

Lithium salts dissolved in these solvents include, for example, $LiClO_4$, $LiBF_4$, $LiPF_6$, $LiAlCl_4$, $LiSbF_6$, LISCN, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte alone or in any combination thereof within the scope that does not impair the effect of the present invention. Among them, it is particularly preferable to add $LiPF_6$.

For the non-aqueous electrolyte used in the present invention, an electrolyte containing at least ethylene carbonate and methyl carbonate, and containing $LiPF_6$ as a lithium salt, is particularly preferable. An electrolyte containing GBL as the main solvent is preferred, and in this case, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte used in the battery is not particularly specified, but a suitable amount should be used according to the amount of the positive electrode active material and negative electrode material and the size of the battery. The amount of the lithium salt to be dissolved in the non-aqueous solvent is not particularly specified, but from 0.2 to 2 mol/l is preferable, and from 0.5 to 1.5 mol/l is more preferable.

The electrolyte is used normally by being impregnated or filled into the separator comprising, for example, a porous polymer, glass filter, or non-woven fabric.

To make the electrolyte nonflammable, a halogen-containing solvent such as carbon tetrachloride or chlorotrifluoroethylene may be contained in the electrolyte. Also, carbon dioxide gas may be added in the electrolyte to confer suitability for high temperature storage.

Instead of the liquid electrolyte, a solid electrolyte as described below can also be used. The solid electrolyte is classified into inorganic or organic solid electrolyte.

As the inorganic solid electrolyte, nitrides of Li, halides of Li, and oxysalt of Li are well known. Among them, $Li_4SiO_4$, $Li_4SiO_4$-LiI—LiOH, $xLi_3PO_4$-$(1-x)Li_4SiO_4$, $Li_2SiS_3$, $Li_3PO_4$-$Li_2S$—$SiS_2$ and phosphorus sulfide compounds are effectively used.

As the organic solid electrolyte, on the other hand, there are polymer materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof are effectively used.

It is also possible to use a gel electrolyte formed by impregnating the above non-aqueous liquid electrolyte into the organic solid electrolyte. For the organic solid electrolyte here, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button battery, the positive electrode active material mixture and negative electrode active material mixture are compressed into the shape of a pellet for use. The thickness and diameter of the pellet should be determined according to the size of the battery.

In the case of a sheet, cylindrical or rectangular type battery, the positive electrode active material mixture and negative electrode active material mixture are usually applied (for coating) onto the current collector, and dried and compressed for use. A well known applying method can be used such as a reverse roll method, direct roll method, blade method, knife method, extrusion method, curtain method, gravure method, bar method, casting method, dip method, and squeeze method. Among them, the blade method, knife method, and extrusion method are preferable.

The application is conducted preferably at a rate of from 0.1 to 100 m/min. By selecting the appropriate applying method according to the solution properties and drying characteristics of the mixture, an applied layer with good surface condition can be obtained. The application to a current collector can be conducted on one side of the current collector, or on the both sides thereof at the same time. Preferably, the applied layers are formed on both sides of the current collector, and the applied layer on one side may be constructed from a plurality of layers including a mixture layer. The mixture layer contains a binder and an electrically conductive material, in addition to the material responsible for the intercalation and releasing of a lithium ion, like the positive electrode active material or negative electrode material. In addition to the mixture layer, a layer containing no active material such as a protective layer, a under coating layer formed on the current collector, and an intermediate layer formed between the mixture layers may be provided. It is preferable that these active-material non-containing layers contain an electrically conductive particle, an insulating particle and a binder.

The application may be performed continuously or intermittently or in such a manner as to form stripes. The thickness, length, and width of the applied layer is determined according to the size of the battery, but preferably, the thickness of the applied layer on each side, after being dried and compressed, is from 1 to 2000 μm.

For drying or dehydration method of the pellet and sheet as the mixture, a commonly employed method can be used. Preferably, heated air, vacuum, infrared radiation, far infrared radiation, electron beam radiation and low humidity air are used alone or in any combination thereof.

The temperature used is preferably within the range of 80 to 350° C., and more preferably 100 to 250° C. The water content of the battery as a whole is preferably held to 2000 ppm or less, and for the positive electrode material mixture, negative electrode material mixture and electrolyte, it is preferable to hold the water content to 500 ppm or less in view of the cycle characteristics.

For the sheet pressing method, a commonly employed method can be used, but a mold pressing method and calender pressing method are particularly preferable. The pressure for use is not particularly specified, but from 0.2 to 3 t/cm² is preferable. In the case of the calender pressing method, a press speed is preferably from 0.1 to 50 m/min.

The pressing temperature is preferably between room temperature and 200° C. The ratio of the width of the positive electrode sheet to the width of the negative electrode sheet is preferably at 0.9 to 1.1, and more preferably at 0.95 to 1.0. The ratio of the content of the positive electrode active material to the content of the negative electrode material cannot be specified because it differs according to the kind of the compound used and the formulation of the mixture, but those skilled in the art can set an optimum value considering the capacity, cycle characteristics and safety.

The wound electrode structure in the present invention need not necessarily be formed in a true cylindrical shape, but may be formed in the shape of an elliptic cylinder whose cross section is an ellipse or in the shape of a rectangular column having a prismatic shape or a rectangular face, for example.

The present invention will now be described with reference to representative examples, but it will be recognized that the invention is not limited to the particular examples given hereinafter.

EXAMPLE 1 AND COMPARATIVE EXAMPLE 1

Figure 12:
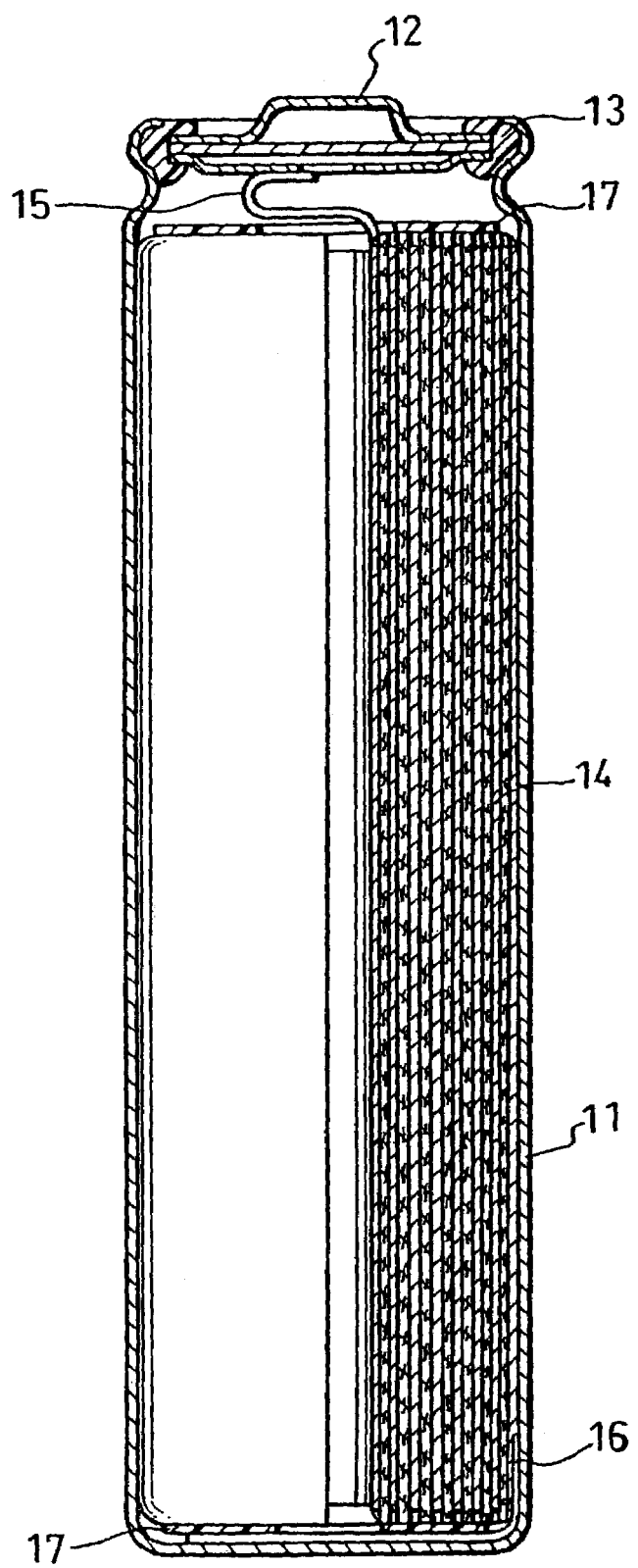
FIG. 12 is a schematic vertical cross-sectional view of a cylindrical battery of an example in accordance with the present invention.

FIG. 12 is a schematic vertical cross-sectional view of a cylindrical battery produced in this example.

A battery case 11 houses an electrode plate group 14 composed of a positive electrode plate and a negative electrode plate wound in a helical shape with a separator therebetween forming a plurality of windings. A positive electrode lead 15 is drawn out from the positive electrode plate and connected to a sealing plate 12, while a negative electrode lead 16 is drawn out from the negative electrode plate and connected to the bottom of the battery case 11. The battery case and the lead plates may be made of a metal or an alloy that is resistant to an organic electrolyte and has electron conductivity. Examples of such a metal and alloy include metals such as iron, nickel, titanium, chromium, molybdenum, copper and aluminum and alloys of these metals. In particular, one machined from a stainless steel plate or an Al—Mn alloy plate is most suitable for the battery case, aluminum for the positive electrode lead, and nickel for the negative electrode lead. Also, for the battery case, various engineering plastics and these in combination with metals may be used for reduction in weight.

Insulating rings 17 are placed on the top and bottom of the electrode plate group 14. After an electrolyte is injected, the battery case is sealed with the sealing plate. A safety valve may be placed at the sealing plate. In addition to the safety valve, various conventionally known safety elements may be placed. For example, as the overcurrent prevention element, a fuse, bimetal, a PTC element or the like may be used. As measures against rise of the internal pressure of the battery case other than placement of the safety valve, the following methods may be employed: forming a slit through the battery case, cracking a gasket, cracking the sealing plate, and disconnecting the lead plate. A protection circuit incorporating a measure against overcharge and overdischarge may be connected to a charger.

As a measure against overcharge, a system of shutting off the current due to rise of the internal pressure of the battery may be provided. For this system, a compound for increasing the internal pressure may be contained in the mixture or the electrolyte. Examples of such a compound for increasing the internal pressure include carbonates such as $Li_2CO_3$, $LiHCO_3$, $Na_2CO_3$, $NaHCO_3$, $CaCO_3$ and $MgCO_3$. The cap, the battery case, the sheet and the lead plates may be welded by a known method (for example, DC or AC electric welding, laser welding or ultrasonic welding). As the sealant for the sealing plate, a conventionally known compound or mixture such as asphalt may be used.

The positive electrode plate was produced in the following manner. Ten parts by weight of carbon powder as the conductive material and 5 parts by weight of a polyvinylidene fluoride resin as the binder were mixed with 85 parts by weight of the positive electrode active material powder of the present invention. The resultant mixture was dispersed in dehydrated N-methyl pyrrolidinone to obtain slurry, and the slurry was applied to a positive electrode current collector made of aluminum foil, which was then dried, rolled, and cut to a predetermined size. The negative electrode plate was produced in the following manner. A carbonaceous material as the main material was mixed with a styrene-butadiene rubber binder at a weight ratio of 100:5 and, the resultant mixture was applied to both surfaces of copper foil, which was then dried, rolled, and cut to a predetermined size. As the separator, a polyethylene microporous film was used. As the organic electrolyte, that obtained by dissolving 1.5 mol/liter of $LiPF_6$ in a mixed solvent of ethylene carbonate and ethyl methyl carbonate in a volume ratio of 1:1 was used. The resultant cylindrical battery was 18 mm in diameter and 650 mm in height.

As the positive electrode active material, used were four kinds of positive electrode active materials expressed by formula (2) $Li[Li_x(Ni_{1/2}Mn_{1 1/2})_{1-x}]O_2$ wherein x was 0, 0.1, 0.2 and 0.3.

For comparison, a cylindrical battery was produced in the following manner using $LiCO_2$ as the positive electrode active material. Table 2 shows the results of comparison of the electric properties of these batteries.

The batteries were subjected to charge/discharge, in which they were first charged up to 4.2 V with a constant current of 100 mA and then discharged down to 2.0 V with the constant current of 100 mA. This charge/discharge was repeated for several cycles, and once the battery capacity became constant, the capacity was checked.

The conditions for the check of the capacity are as follows. As the charge, 4.2 V constant voltage charge was performed with a maximum current of 1 A. The charge was terminated when the current value reached 50 mA. As the discharge, 300 mA constant current discharge was performed down to 2.5 V. The discharge capacity obtained at this time was determined as the discharge capacity of the battery. The charge/discharge was conducted in an atmosphere of 25° C. The high-rate discharge ratio was obtained in the following manner; regarding the battery capacity is 1C, the discharge capacity at a current value in the 5 hour rate discharge (0.2C) and the discharge capacity at a current value in the 0.5 hour rate discharge (2C) were measured, and the capacity ratio 0.2C/2C was calculated. The low-temperature discharge ratio was obtained by measuring the discharge capacities obtained when discharged at the 1C current at 20° C. and at −10° C. and calculating the discharge capacity ratio (−10° C./20° C.). The cycle life was obtained by calculating the ratio of the capacity after 100 cycles to the initial capacity.

TABLE 2

| | x in Li[Li$_x$(Ni$_{1/2}$Mn$_{1/2}$)$_{1-x}$]O$_2$ | Capacity (mAh) | High-rate discharge ratio (%) | Low-temp. discharge ratio (%) | Cycle life |
|---|---|---|---|---|---|
| Ex.1 | 0 | 1588 | 95 | 70 | 90 |
| | 0.1 | 1576 | 95 | 70 | 91 |
| | 0.2 | 1545 | 96 | 72 | 92 |
| | 0.3 | 1490 | 96 | 71 | 92 |
| Comp. Ex.1 | LiCoO$_2$ | 1500 | 92 | 50 | 85 |

When the oxide expressed by Li[Li$_x$(Ni$_{1/2}$Mn$_{1/2}$)$_{1-x}$]O$_2$ was used as the positive electrode active material, charge/discharge was repeated at substantially the same discharge voltage as described above. Also, as is found from Table 2, the battery capacity decreases with increase of the value of x and, therefore, the charge/discharge capacities can be controlled by controlling the quantity of the lithium element freely within the above range. Thus, the present invention capable of non-electrochemically synthesizing the positive electrode active material with such charge/discharge behavior, presents a guideline for novel material design.

Moreover, from the results shown in FIG. 2, it is found that the batteries of the present invention are superior in all the items tested. Therefore, by applying the materials of the present invention to lithium secondary batteries as the positive electrode active material, the resultant batteries can be superior to the conventionally mainstream batteries using LiCoO$_2$.

EXAMPLE 2
Reduction in Polarization

LiNiO$_2$ and LiMnO$_2$ are not so good in electron conductivity. Therefore, large polarization occurs in the final stage of discharge, causing decrease in capacity particularly during high-rate discharge. The nickel element and the manganese element have different electron structures. When these elements are incorporate together in the atomic level, one electron structure interacts with the electron structure of the neighboring different element.

In the combination of nickel and manganese, the above phenomenon especially functions to improve the electron conductivity of the material, whereby conductivity is rendered. This is considered verifiable by computational chemistry such as a DV-xα Method.

When the composition of the oxide is LiNi$_{1/2}$Mn$_{1/2}$O$_2$, polarization can clearly be reduced compared with the cases of LiNiO$_2$ and LiMnO$_2$. Further, polarization can be reduced by adding another transition metal element while maintaining the 1:1 nickel-manganese ratio. In this example, an oxide expressed by formula LiCo$_{1/3}$Ni$_{1/3}$Mn$_{1/3}$O$_2$ was synthesized. The high-rate discharge rate measurement shown in Table 3 was also performed in this example by producing the battery shown in FIG. 12.

TABLE 3

| | | High-rate discharge ratio (%) (2 C./0.2 C., 20° C.) |
|---|---|---|
| Ex.2 | LiNi$_{1/2}$Mn$_{1/2}$O$_2$ | 95 |
| | LiCo$_{1/3}$Ni$_{1/3}$Mn$_{1/3}$O$_2$ | 97 |
| Comp.Ex.1 | LiCoO$_2$ | 92 |

From Table 3, it is found that the high-rate discharge rate improved by addition of the cobalt element. The reason is presumably as follows. The discharge voltage sharply decreases in the final stage of discharge. By the addition of cobalt, the voltage drop in this part was presumably improved. The same effect was also observed when this element was added.

EXAMPLE 3

Stability of Material

When Li is removed from LiNiO$_2$ by charging, LiNiO$_2$ becomes very unstable and is reduced to NiO releasing oxygen at a comparatively low temperature. This is fatal when LiNiO$_2$ is used as the positive electrode active material of a battery, and the battery may possibly be led to thermal runaway, that is, ignition or explosion due to oxygen generated.

The above problem can be improved by incorporating manganese at a ratio of 1:1. The batteries used in Example 1 were overcharged to as high as 4.8 V, and then disassembled to collect the positive electrode mixtures. The mixtures were measured with a differential scanning calorimeter (DSC) as they were. The heat peaks observed at the lowest temperature obtained at this time are shown in Table 4.

It is well known that the thermal stability improves by adding aluminum. The test described above was also performed for a positive electrode active material obtained by adding aluminum to LiNi$_{1/2}$Mn$_{1/2}$O$_2$. The added amount of aluminum was 10 at. % of the total amount of the nickel and cobalt elements. The battery shown in FIG. 12 was produced as in Example 1, overcharged to as high as 4.8 V, and subjected to the DSC measurement. The results are also shown in Table 4.

TABLE 4

| | x in Li[Li$_x$(Ni$_{1/2}$Mn$_{1/2}$)$_{1-x}$]O$_2$ | 1st peak temperature (° C.) of DSC measurement |
|---|---|---|
| Ex.3 | 0 | 168 |
| | 0.1 | 173 |
| | 0.2 | 181 |
| | 0.3 | 190 |
| | 0 10 at. % of Al added | 195 |
| Comp.Ex.1 | LiCoO$_2$ | 118 |

From Table 4, it is found that the exothermal temperature rose compared with the comparative example. Also, the exothermal temperature roses as the value of x of formula Li[Li$_x$(Ni$_{1/2}$Mn$_{1/2}$)$_{1-x}$]O$_2$ increased. The reason is regarded as follows.

As shown in FIG. 9, the crystal structure of Li[Li$_x$(Ni$_{1/2}$Mn$_{1/2}$)$_{1-x}$]O$_2$ greately changes by overcharge and this brings thermal stability. It is therefore considered that the thermal stability of Li[Li$_x$(Ni$_{1/2}$Mn$_{1/2}$)$_{1-x}$]O$_2$ (x=0.1 to 0.3) with excessively added Li improves by overcharge due to the mechanism described above. Moreover, it is found that, with addition of aluminum, the exothermal temperature further rose and thus the thermal stability significantly increased. The added amount of aluminum was examined and it was found that the range of 5 to 35 mol % with respect to the total amount of aluminum and the transition metals exhibited preferable results. When the added amount was less than 5 mol %, no sufficient effect was obtained and, when it exceeded 35 mol %, the capacity decreased.

In the above examples, a carbonaceous material was used as the negative electrode active material for evaluation of the performance of the positive electrode but the material for the negative electrode is not limited to this and, therefore, alloys, lithium metal, relatively low potential oxides and nitrides, and the like may be used. In the above examples, as the electrolyte, that obtained by dissolving 1.5 mol/liter of $LiPF_6$ in a mixed solvent of ethylene carbonate and ethyl methyl carbonate in a volume ratio of 1:1 was used. The electrolyte is not limited to this, but an organic or inorganic solid electrolyte may be used.

EXAMPLES 4 AND 5 AND COMPARATIVE EXAMPLES 2 TO 9

Peak of Precursor

A mixed solution of 1.2 mol/liter of an aqueous nickel sulfate solution, 1.2 mol/liter of an aqueous manganese sulfate solution, and 1.2 mol/liter of an aqueous cobalt sulfate solution, as well as 4.8 mol/liter of an aqueous NaOH solution and 4.8 mol/liter of a $NH_3$ solution, were fed into the reaction bath 6 of the apparatus shown in FIG. 4 at a rate of 0.5 milliliter/minute, to obtain a nickel-manganese-cobalt composite hydroxide as a precursor "a" of the present invention. Dissolved oxygen in the reaction bath was purged by bubbling argon gas. Also, hydrazine was added under adjustment to prevent a magnetic substance such as excessively reduced CoO from being included in the precursor as the reactant. The X-ray diffraction pattern of the precursor "a" is shown in (a) of FIG. 6.

The precursor "a" and lithium hydroxide were mixed so that the atomic ratio of Li to Ni, Mn and Co satisfies Li/(Ni+Mn+Co)=1, and the mixture was heated to 1000° C. at one rise and sintered at this temperature for 10 hours. After the sintering, the temperature was first lowered to 700° C., at which annealing was performed for 5 hours, and then gradually lowered, thereby to obtain the positive electrode active material "a" ($LiNi_{1/3}Mn_{1/3}Co_{1/3}O_2$) of the present invention (Example 4).

A nickel-manganese oxide (nickel:manganese=1:1) as a precursor "b" of the present invention was also obtained in the same manner as that described above except that cobalt sulfate was not used. The X-ray diffraction pattern of the precursor "b" is shown in (b) of FIG. 6.

The precursor "b" and lithium hydroxide were mixed so that the atomic ratio of Li to Ni and Mn satisfied Li/(Ni+Mn)=1, and the resultant mixture was heated to 1000° C. at one rise and sintered at this temperature for 10 hours. After the sintering, the temperature was first lowered to 700° C., at which annealing was performed for 5 hours, and then gradually lowered, thereby to obtain the positive electrode active material "b" ($LiNi_{1/2}Mn_{1/2}O_2$) of the present invention (Example 5).

Nickel-manganese hydroxides "c" to "j" (nickel:manganese=1:1) were obtained in the same manner as that described above except that neither bubbling of argon gas nor addition of hydrazine was performed. The X-ray diffraction patterns of these hydroxides are shown in (c) to (j) of FIG. 6. Using the hydroxides c to j and lithium hydroxide, the positive electrode active materials "c" to "j" were obtained in the manner described above (Comparative Examples 2 to 9).

The electrochemical properties of the resultant positive electrode active materials were evaluated by producing coin-shaped batteries.

The coin-shaped batteries were produced in the following manner. The positive electrode active materials "a" to "j" obtained at various sintering temperatures, acetylene black as the conductive material, and a polyvinylidene fluoride resin (PVDF) as the binder were mixed at a weight ratio of 80:10:10, to obtain a sheet-shaped molded article. The molded article was stamped into a disk shape and dried under vacuum at 80° C. for about 15 hours, to obtain a positive electrode. Also, a sheet-shaped lithium metal was stamped into a disk shape, to obtain a negative electrode. A polyethylene microporous film was used as a separator. One mol of $LiPF_6$ was dissolved in a mixed solvent of ethylene carbonate (EC) and ethyl methyl carbonate (EMC) in 1:3 (volume ratio) to prepare an electrolyte.

Coin-shaped batteries of 2016 size (20 mm in diameter and 1.6 mm in thickness) were produced using the above materials by a normal method, and the produced coin-shaped batteries were discharged at 4.3 V at a constant current value equivalent to the 10 hour rate. The discharge capacity per gram of each of the positive electrode active materials was obtained. The results are shown in Table 5.

In addition, cylindrical batteries were produced as in Example 1, and the cycle life was obtained as in Example 1. The results are shown in Table 5.

TABLE 5

| Precursor | Composition | Discharge capacity (mAh/g) | Cycle life |
|---|---|---|---|
| a | $LiNi_{1/3}Mn_{1/3}Co_{1/3}O_2$ | 165 | 100 |
| b | $LiNi_{1/2}Mn_{1/2}O_2$ | 155 | 102 |
| c | $LiNi_{1/2}Mn_{1/2}O_2$ | 142 | 69 |
| d | $LiNi_{1/2}Mn_{1/2}O_2$ | 139 | 68 |
| e | $LiNi_{1/2}Mn_{1/2}O_2$ | 138 | 65 |
| f | $LiNi_{1/2}Mn_{1/2}O_2$ | 140 | 68 |
| g | $LiNi_{1/2}Mn_{1/2}O_2$ | 136 | 65 |
| h | $L1Ni_{1/2}Mn_{1/2}O_2$ | 145 | 72 |
| i | $LiNi_{1/2}Mn_{1/2}O_2$ | 146 | 75 |
| j | $LiNi_{1/2}Mn_{1/2}O_2$ | 144 | 73 |

Industrial Applicability

According to the present invention, inexpensive nickel-manganese composite oxide can be effectively used as the positive electrode active material, and a good non-aqueous electrolyte battery with high capacity and high charge/discharge efficiency can be provided.

The invention claimed is:

1. A positive electrode active material for a non-aqueous electrolyte battery, comprising crystalline particles of a lithium-containing oxide containing two kinds of transition metal elements, said crystalline particles having a layered crystal structure, and oxygen atoms constituting said lithium-containing oxide forming a cubic closest packing structure, and said two kinds of transition metal elements are nickel element and manganese element, wherein said lithium-containing oxide contains said two kinds of transition metal elements in substantially the same proportion, and said lithium-containing oxide is expressed by formula (3):

where A and B are said two kinds of transition metal elements, C is at least one kind of an added element different from A and B, $0 \leq x \leq 0.3$, $0 < 2y+p \leq 1$, and $\frac{1}{3} \leq y \leq 0.5$ and $0 < p \leq \frac{1}{3}$, a mixture of crystalline particles of said lithium-containing oxide having a particle size of 0.1 to 2 μm and secondary particles of said crystalline particles having a particle size of 2 to 20 μm, and said transition metals are uniformly dispersed in said crystalline particles.

2. The positive electrode active material for a non-aqueous electrolyte battery in accordance with claim 1, wherein the integral intensity ratio $I_{003}/I_{104}$ of the X-ray diffraction peak attributed to Miller indices (003) to that attributed to Miller indices (104) satisfies $I_{003}/I_{104}<1$ in said crystal structure of said crystalline particles.

3. The positive electrode active material for a non-aqueous electrolyte battery in accordance with claim 1, wherein the powder X-ray diffraction peaks attributed to Miller indices (108) and (110) are observed as two split peaks in said crystal structure of the crystalline particles.

4. The positive electrode active material for a non-aqueous electrolyte battery in accordance with claim 1, wherein said crystalline particles are spherical in shape.

5. The positive electrode active material for a non-aqueous electrolyte battery in accordance with claim 1, wherein the volume of unit cells of said crystalline particles decreases by oxidation.

6. The positive electrode active material for a non-aqueous electrolyte battery in accordance with claim 1, wherein the error of the ratio of the nickel element to the manganese element is within 10 atomic %.

7. The positive electrode active material for a non-aqueous electrolyte battery in accordance with claim 1, wherein said lithium-containing oxide is obtained by using a hydroxide or an oxide containing two or more kinds of transition metals as a precursor, in which the half-width of a peak observed in the range of 15 to 20° in X-ray diffraction peaks measured with Kα ray of copper is 3° or less.

8. The positive electrode active material for a non-aqueous electrolyte battery in accordance with claim 7, wherein, in the X-ray diffraction peaks, the peak height $H_1$ observed in the range of 15 to 20° and the peak height $H_2$ observed in the range of 30 to 40° satisfy the relation:

$$H_1 \geq 2 \times H_2.$$

9. The positive electrode active material for a non-aqueous electrolyte battery in accordance with claim 8, wherein said lithium-containing oxide is obtained by mixing said precursor with a lithium compound such as lithium carbonate and/or lithium hydroxide and sintering the mixture.

10. The positive electrode active material for a non-aqueous electrolyte battery in accordance with claim 9, wherein said sintering is performed at a temperature of 900° or higher.

11. A non-aqueous electrolyte secondary battery comprising:
a negative electrode containing, as a negative electrode active material, a substance capable of absorbing/desorbing lithium ions and/or metal lithium; a separator; a positive electrode containing the positive electrode active material in accordance with claim 8; and an electrolyte.

12. The positive electrode active material for a non-aqueous electrolyte battery in accordance with claim 1, wherein said added element C is at least one kind selected from the group consisting of aluminum, magnesium, calcium, strontium, yttrium, ytterbium, iron, and cobalt.

13. The positive electrode active material for a non-aqueous electrolyte battery in accordance with claim 1, wherein the ratio of the amount of said added element C to the total amount of said transition metal elements A and B and said added element C is 5 to 35 mol%.

14. A positive electrode active material for a non-aqueous electrolyte battery, comprising crystalline particles of a lithium-containing oxide containing two kinds of transition metal elements,
said crystalline particles having a layered crystal structure, and
oxygen atoms constituting said lithium-containing oxide forming a cubic closest packing structure, and
said two kinds of transition metal elements are nickel element and manganese element,
wherein said lithium-containing oxide contains said two kinds of transition metal elements in substantially the same proportion, and
said lithium-containing oxide is expressed by formula (3):

$$Li[Li_x(A_yB_yC_p)_{1-x}]O_2$$

where A and B are said two kinds of transition metal elements, C is at least one kind of an added element different from A and B, $0 \leq x \leq 0.3$, $0<2y+p \leq 1$, and $\frac{1}{3} \leq y \leq 0.5$ and $0<p \leq \frac{1}{3}$, a mixture of crystalline particles of said lithium-containing oxide having a particle size of 0.1 to 2 μm and secondary particles of said crystalline particles having a particle size of 2 to 20 μm,
said transition metals are uniformly dispersed in said crystalline particles, and
said secondary particles are substantially spherical sintered particles.

* * * * *

UNITED STATES PATENT AND TRADEMARK OFFICE
CERTIFICATE OF CORRECTION

PATENT NO. : 7,592,100 B2
APPLICATION NO. : 10/333269
DATED : September 22, 2009
INVENTOR(S) : Tsutomu Ohzuku et al.

It is certified that error appears in the above-identified patent and that said Letters Patent is hereby corrected as shown below:

On the Title Page

Item "(75) Inventors:"
Please change "Hiroshi Yoshizawa, Hirakata (JP)" to --Yoshizawa, Osaka (JP)--
Please change "Masatoshi Nagayama, Hirakata (JP)" to --Masatoshi Nagayama, Osaka (JP)--

In addition, Item "(56) References Cited" under "Foreign Patents Documents", we note the following errors:
The reference "JP 05-283076" appears twice. Please delete the first occurrence.
The reference "JP 9-129230 A" appears twice. Please delete the second occurrence.
The reference "JP 2000-133262 A" appears twice. Please delete the first occurrence.
Please change "JP 08-213015 A   August, 1998" to --JP 08-213015 A   August, 1996--

In Item "(56) References Cited" under "Other Publications" we note the following errors:
Please change
"Layered Cathode Materials Li[Ni$_x$Li$_{(1/3-2x/3)}$Mn$_{(2/3-x/3)}$]O$_z$ for Lithium-ion Batteries. Zhonghua Lu, et al.
*Electrochemical and Solid-State Letters* 4(11)(2001), pp.A191-A194"
to
--Layered Cathode Materials Li[Ni$_x$Li$_{(1/3-2x/3)}$Mn$_{(2/3-x/3)}$]O$_2$ for Lithium-ion Batteries. Zhonghua Lu, et al.
*Electrochemical and Solid-State Letters* 4(11)(2001), pp.A191-A194.--

Please change
"Synthesis, Structure, and Electrochemical Behavior of Li[Ni$_x$Li$_{1/3-2x/3}$Mn$_{2/3-x/3}$]O$_z$. Zhonghua Lu, et al. Journal of the Electrochemical Society 149(6)(2002) pp A778-A791"
to
--Synthesis, Structure, and Electrochemical Behavior of Li[Ni$_x$Li$_{1/3-2x/3}$Mn$_{2/3-x/3}$]O$_2$. Zhonghua Lu, et al. Journal of the Electrochemical Society 149(6)(2002) pp A778-A791--

Signed and Sealed this
Second Day of April, 2013

Teresa Stanek Rea
*Acting Director of the United States Patent and Trademark Office*

CERTIFICATE OF CORRECTION (continued)
U.S. Pat. No. 7,592,100 B2

Item (56) (continued)

Please change
LU, Z. et al., "Layered Cathode Materials Li[Ni$_x$Li$_{(1/3-2x/3)}$Mn$_{(2/3x/3)}$]O$_2$ for Lithium-Ion Batteries, Electrochemical and Solids-State Letters, 2001, pg A191-A194, Vol. 4, The Electrochemical Society, Inc.
to
--LU, Z. et al., "Layered Cathode Materials Li[Ni$_x$Li$_{(1/3-2x/3)}$Mn$_{(2/3x/3)}$]O$_2$ for Lithium-Ion Batteries, Electrochemical and Solid-State Letters, 2001, pg A191-A194, Vol. 4, The Electrochemical Society, Inc--

Please change:
NEUDECKER, B.J. et al., "Lithium Manganese Nickel Oxides Li$_x$(Mn$_y$Ni$_{1-y}$)$_{2-x}$O$_2$," J. Electrochem. Soc., December 1998, pg 4148-1459, Vol. 145, No. 12, The Electrochemical Society, Inc.
to
NEUDECKER, B.J. et al., "Lithium Manganese Nickel Oxides Li$_x$(Mn$_y$Ni$_{1-y}$)$_{2-x}$O$_2$," J. Electrochem. Soc., December 1998, pg 4148-4159, Vol. 145, No. 12, The Electrochemical Society, Inc.

Please change:
Yoshio, M. et al. "Preparation and properties LiCo$_y$Mn$_z$Ni$_{1-x-y}$O$_2$ as a chathode for lithium ion batteries," Journal of Power Sources, August 17, 1998, p. 176-181, vol. 90, Elsevier
to
--Yoshio, M. et al. "Preparation and properties of LiCo$_y$Mn$_x$Ni$_{1-x-y}$O$_2$ as a cathode for lithium ion batteries," Journal of Power Sources, August 17, 1998, p. 176-181, vol. 90, Elsevier--